United States Patent

Taniguchi

(10) Patent No.: US 10,421,908 B2
(45) Date of Patent: *Sep. 24, 2019

(54) LIQUID CRYSTAL COMPOSITION AND LIQUID CRYSTAL DISPLAY DEVICE INCLUDING THE SAME

(71) Applicant: DIC Corporation, Tokyo (JP)

(72) Inventor: Shiro Taniguchi, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/077,619

(22) PCT Filed: Feb. 23, 2017

(86) PCT No.: PCT/JP2017/006769
§ 371 (c)(1),
(2) Date: Aug. 13, 2018

(87) PCT Pub. No.: WO2017/154590
PCT Pub. Date: Sep. 14, 2017

(65) Prior Publication Data
US 2019/0048262 A1  Feb. 14, 2019

(30) Foreign Application Priority Data

Mar. 8, 2016  (JP) ................. 2016-044390

(51) Int. Cl.
*G02F 1/13* (2006.01)
*C09K 19/34* (2006.01)
*C09K 19/54* (2006.01)
*C09K 19/46* (2006.01)
*G02F 1/137* (2006.01)
*C09K 19/04* (2006.01)
*C09K 19/12* (2006.01)
*C09K 19/30* (2006.01)

(52) U.S. Cl.
CPC .......... *C09K 19/3483* (2013.01); *C09K 19/46* (2013.01); *C09K 19/54* (2013.01); *G02F 1/13* (2013.01); *G02F 1/137* (2013.01); *C09K 2019/0448* (2013.01); *C09K 2019/0466* (2013.01); *C09K 2019/123* (2013.01); *C09K 2019/301* (2013.01); *C09K 2019/3004* (2013.01); *C09K 2019/3025* (2013.01); *G02F 2001/13706* (2013.01)

(58) Field of Classification Search
CPC .................................. C09K 19/54
See application file for complete search history.

(56) References Cited

U.S. PATENT DOCUMENTS

| 4,075,165 | A | 2/1978 | Soma et al. |
| 4,124,564 | A | 11/1978 | Minagawa et al. |
| 4,141,883 | A | 2/1979 | Soma et al. |
| 4,238,613 | A | 12/1980 | Rasberger et al. |
| 4,396,735 | A | 8/1983 | Minagawa et al. |
| 4,404,301 | A | 9/1983 | Kubota et al. |
| 4,668,722 | A | 5/1987 | Mack |
| 4,906,604 | A | 3/1990 | Okamoto et al. |
| 5,439,958 | A | 8/1995 | Scrima et al. |
| 9,631,142 | B2 | 4/2017 | Gotoh et al. |
| 2004/0157064 | A1 | 8/2004 | Aoki |
| 2006/0189777 | A1 | 8/2006 | Aoki |
| 2007/0108411 | A1 | 5/2007 | Saito et al. |
| 2008/0003439 | A1 | 1/2008 | Aoki |
| 2008/0231788 | A1 | 9/2008 | Yoshida et al. |
| 2009/0142515 | A1 | 6/2009 | Nakamura et al. |
| 2010/0149950 | A1 | 6/2010 | Yoshida et al. |
| 2011/0037910 | A1 | 2/2011 | Yoshida et al. |
| 2011/0101270 | A1 | 5/2011 | Manabe et al. |

(Continued)

FOREIGN PATENT DOCUMENTS

| EP | 0 518 807 A1 | 12/1992 |
| EP | 0 636 610 A1 | 2/1995 |

(Continued)

OTHER PUBLICATIONS

International Search report dated Apr. 4, 2017, isued in counterpart application No. PCT/JP2017/006769. (3 pages).
Decision to Grant a Patent dated Feb. 27, 2018, Issued in counterpart Japanese Patent Application No. 2017-563264, w/English translation (5 pages).
Zeika et al ., "Synthesis of Polynitroxides Based on Nucleophilic Aromatic Substitution", Organic Letters, 2010, vol. 12, No. 16, pp. 3696-3699(4 pages).

(Continued)

*Primary Examiner* — Chanceity N Robinson
(74) *Attorney, Agent, or Firm* — Westerman, Hattori, Daniels & Adrian, LLP

(57) ABSTRACT

The liquid crystal composition contains one or two or more compounds represented by general formula (I): and one or two or more compounds represented by general formula (J). The liquid crystal composition is highly practical as a liquid crystal composition for liquid crystal displays and is effective in achieving high contrast, faster response, and high quality reliability

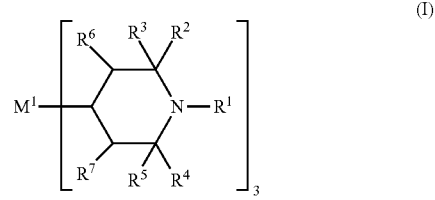

(I)

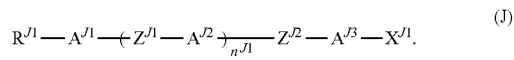

(J)

8 Claims, No Drawings

(56) References Cited

U.S. PATENT DOCUMENTS

| | | | |
|---|---|---|---|
| 2012/0268706 A1* | 10/2012 | Goebel | C09K 19/3483 |
| | | | 349/143 |
| 2015/0159088 A1 | 6/2015 | Goebel et al. | |
| 2015/0192852 A1 | 7/2015 | Sato et al. | |
| 2015/0337202 A1 | 11/2015 | Furusato et al. | |
| 2016/0039758 A1 | 2/2016 | Gotoh et al. | |
| 2016/0090534 A1 | 3/2016 | Gotoh et al. | |
| 2016/0122647 A1 | 5/2016 | Furusato et al. | |
| 2016/0289189 A1 | 10/2016 | Gotoh et al. | |
| 2017/0158960 A1 | 6/2017 | Sudo et al. | |
| 2018/0223188 A1* | 8/2018 | Iwakubo | C09K 19/3444 |

FOREIGN PATENT DOCUMENTS

| | | |
|---|---|---|
| EP | 2 982 731 A1 | 2/2016 |
| JP | S51-132242 A | 11/1976 |
| JP | S51-139841 A | 12/1976 |
| JP | S52-100543 A | 8/1977 |
| JP | S54-72248 A | 6/1979 |
| JP | S57-177053 A | 10/1982 |
| JP | 6-235925 A | 8/1994 |
| JP | 2001-114762 A | 4/2001 |
| JP | 2004-190013 A | 7/2004 |
| JP | 2006-37054 A | 2/2006 |
| JP | 2007-137921 A | 6/2007 |
| JP | 2011-519985 A | 7/2011 |
| JP | 2012-224632 A | 11/2012 |
| JP | 2016-64995 A | 4/2016 |
| WO | 2007/046384 A1 | 4/2007 |
| WO | 2007/072643 A1 | 6/2007 |
| WO | 2014/045783 A1 | 3/2014 |
| WO | 2014/208320 A1 | 12/2014 |
| WO | 2015/076077 A1 | 5/2015 |
| WO | 2016/006524 A1 | 1/2016 |

OTHER PUBLICATIONS

Luckhurst et al ., "Electron Paramagnetic Resonance of Quartet Ground State in Luquid Cristal Solutions", Izvestiya Akademii Nauk SSSR, Seriya Khimicheskaya, 1968, vol. 8, pp. 1708-1710, with English translation (6 pages).

* cited by examiner

LIQUID CRYSTAL COMPOSITION AND LIQUID CRYSTAL DISPLAY DEVICE INCLUDING THE SAME

TECHNICAL FIELD

The present invention relates to a nematic liquid crystal composition that is useful as an electro-optical liquid crystal display material and that exhibits a positive value of dielectric anisotropy ($\Delta\varepsilon$).

BACKGROUND ART

Liquid crystal display devices are used for, for example, timepieces, electronic calculators, various measuring instruments, automotive panels, word processors, electronic notepads, printers, computers, television sets, timepieces, and advertising display panels. Typical examples of a liquid crystal display mode include a twisted nematic (TN) mode, a super-twisted nematic (STN) mode, a vertical alignment (VA) mode and an in-plane switching (IPS) mode/an FFS mode including thin-film transistors (TFTs), the VA mode being characterized by vertical alignment, the IPS and FFS modes being characterized by horizontal alignment. Liquid crystal compositions used for these liquid crystal display devices are required to be stable to external factors such as water, air, heat, and light, to exhibit a liquid crystal phase over a wider temperature range centered on room temperature, and to have a low viscosity and a low driving voltage. Liquid crystal composition are each composed of several to several tens of compounds in order to optimize properties such as dielectric anisotropy ($\Delta\varepsilon$) and/or refractive-index anisotropy ($\Delta n$).

Liquid crystal compositions having negative $\Delta\varepsilon$ are used in vertical-alignment displays. Liquid crystal compositions having positive $\Delta\varepsilon$ are used in horizontal-alignment displays such as TN, STN, and IPS-mode displays. A driving mode has recently been reported in which a liquid crystal composition having positive $\Delta\varepsilon$ is vertically aligned in the absence of an applied voltage and is driven by applying an IPS/FFS-mode electric field. There is a growing need for liquid crystal compositions having positive $\Delta\varepsilon$. Liquid crystal compositions are also required to have a low driving voltage, a high response speed, and a wide operating temperature range in all driving modes. Specifically, liquid crystal compositions are required to have positive $\Delta\varepsilon$ that is large in absolute value, a low viscosity ($\eta$), and a high nematic phase-isotropic liquid phase transition temperature ($T_{ni}$). The $\Delta n$ of a liquid crystal composition needs to be adjusted to an appropriate range, depending on a cell gap (d) in consideration of the product of $\Delta n$ and the cell gap (d), i.e., $\Delta n \times d$. Liquid crystal compositions used in, for example, television sets are also required to have low $\gamma_1$ because emphasis is placed on fast response in these applications.

In addition to a reduction in viscosity for a higher response speed, liquid crystal compositions are required to have only small variations in quality and performance with time even during prolonged use in order to achieve the longer service life of liquid crystal display devices. In particular, liquid crystal materials, which are generally low-molecular-weight organic compounds, have the problem of low stability to ultraviolet radiation. To solve the problem, inventions relating to a liquid crystal composition containing a compound having a pyrimidine ring and an additive (Patent Literature 1) and a liquid crystal composition containing a liquid crystal composition that contains specific compounds and that has negative dielectric anisotropy and an additive (Patent Literature 2) are disclosed.

Vertical alignment (VA)-mode and in-plane switching (IPS)-mode liquid crystal display devices containing liquid crystal compositions have been widely used. Very large-screen display devices having a size of 50 or more have been put to practical use and used. As the substrate size increases, the mainstream of a method for injecting a liquid crystal composition into a substrate has shifted from a conventional vacuum injection method to a one-drop-fill (ODF) method (see Patent Literature 3). This leads to a manifestation of the problem of the degradation of display quality due to drop marks formed when the liquid crystal composition is dropped onto the substrate. A problem arises in the case of a decrease in the yield of a liquid crystal display device due to display defects. Also in the case where additives such as an antioxidant and a light-absorbing agent are added to a liquid crystal composition, such a problem of the decrease in yield can arise. In addition to the drop marks, a problematic phenomenon called image-sticking may occur in which when the static image continues to be displayed for a prolonged period of time on a liquid crystal display device, a faint image of the original image is displayed even when the display is off. There is a need for the development of a liquid crystal display device having both good characteristics such as contrast and response speed, which are the fundamental performance of a liquid crystal display device, and the high reliability of image quality in which image-sticking and drop marks are not easily formed. There is also a need for the development of a liquid crystal composition appropriate therefor.

CITATION LIST

Patent Literature

PTL 1: Japanese Unexamined Patent Application Publication No. 2007-137921
PTL 2: Japanese Unexamined Patent Application Publication No. 2012-224632
PTL 3: Japanese Unexamined Patent Application Publication No. 6-235925

SUMMARY OF INVENTION

Technical Problem

The present invention aims to provide a liquid crystal composition having a high resistivity, a high voltage holding ratio, and stability to heat and light; and an IPS- or TN-mode liquid crystal display device that contains the liquid crystal composition, that thus has good display quality, and that is less likely to cause display defects such as image-sticking and drop marks.

Solution to Problem

The inventors have conducted studies on various liquid crystal compounds and various chemical substances and have found that the use of specific compounds solves the foregoing problems. This finding has led to the completion of the present invention.

The present invention provides a liquid crystal composition containing one or two or more compounds represented by general formula (I):

[Chem. 1]

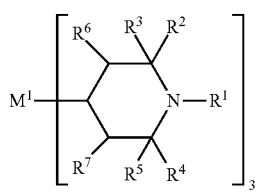

(where in the formula, $R^1$ is a hydrogen atom, —O., —OH, or an alkyl group having 1 to 12 carbon atoms, one or two or more —CH$_2$— groups present in the alkyl group are each independently optionally replaced with —O—, —S—, —CH=CH—, —C≡C—, —CO—, —CO—O—, —O—CO—, —OCF$_2$—, or —CF$_2$O—, $R^2$, $R^3$, $R^4$, and $R^5$ are each independently an alkyl group having 1 to 8 carbon atoms, one or two or more —CH$_2$— groups present in the alkyl group are each independently optionally replaced with —O—, —S—, —CH=CH—, —C≡C—, —CO—, —CO—O—, —O—CO—, —OCF$_2$—, or —CF$_2$O—, $R^2$ and $R^3$ and/or $R^4$ and $R^5$ are taken together to form a ring, $R^6$ and $R^7$ are each independently a hydrogen atom or an alkyl group having 1 to 6 carbon atoms, one or two or more —CH$_2$— groups present in the alkyl group are each independently optionally replaced with —O—, —S—, —CH=CH—, —C≡C—, —CO—, —CO—O—, —O—CO—, —OCF$_2$—, or —CF$_2$O—, $M^1$ is a trivalent organic group, and $R^1$'s, $R^2$'s, $R^3$'s, $R^4$'s, $R^5$'s, $R^6$'s, and $R^7$'s present in a plurality are optionally the same or different); and one or two or more compounds represented by general formula (J):

[Chem. 2]

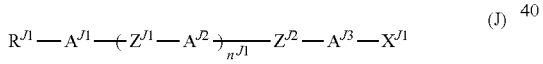

(where in the formula, $R^{J1}$ is an alkyl group having 1 to 10 carbon atoms, one —CH$_2$— group or two or more non-adjacent —CH$_2$— groups in the alkyl group are each independently optionally replaced with —CH=CH—, —C≡C—, —O—, —CO—, —COO—, or —OCO—, $n^{J1}$ is 0, 1, 2, 3, or 4, $A^{J1}$, $A^{J2}$, and $A^{J3}$ are each independently a group selected from the group consisting of:
(a) a 1,4-cyclohexylene group (where one —CH$_2$— group or two or more non-adjacent —CH$_2$— groups present in the group are each optionally replaced with —O—),
(b) a 1,4-phenylene group (where one —CH= group or two or more non-adjacent —CH= groups present in the group are each optionally replaced with —N=), and
(c) a naphthalene-2,6-diyl group, a 1,2,3,4-tetrahydronaphthalene-2,6-diyl group, or a decahydronaphthalene-2,6-diyl group (where one —CH= group or two or more non-adjacent —CH= groups present in the naphthalene-2,6-diyl group or the 1,2,3,4-tetrahydronaphthalene-2,6-diyl group are each optionally replaced with —N=), the groups (a), (b), and (c) are each independently optionally substituted with a cyano group, a fluorine atom, a chlorine atom, a methyl group, a trifluoromethyl group, or a trifluoromethoxy group, $Z^{J1}$ and $Z^{J2}$ are each independently a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—, in the case where $n^{J1}$ is 2, 3, or 4 and where a plurality of $A^{J1}$'s are present, $A^{J1}$'s are optionally the same or different, in the case where $n^{J1}$ is 2, 3, or 4 and where a plurality of $Z^{J1}$'s are present, $Z^{J1}$'s are optionally the same or different, and $X^{J1}$ is a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group). The present invention also provides a liquid crystal display device containing the liquid crystal composition.

Advantageous Effects of Invention

The liquid crystal composition according to the present invention is very useful because of its only slight variations in resistivity and the voltage holding ratio depending on heat and light and its great practical utility in the production of a product and because display defects such as image-sticking and drop marks are inhibited in, for example, an IPS— or FFS-mode liquid crystal display device containing the liquid crystal composition.

DESCRIPTION OF EMBODIMENTS

A liquid crystal composition according to the present invention contains, as a first component, one or two or more compounds represented by general formula (I):

[Chem. 3]

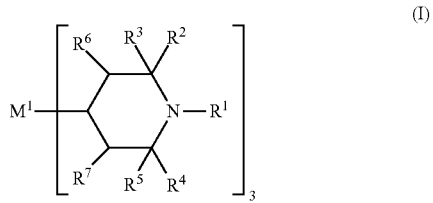

(where in the formula, $R^1$ is a hydrogen atom, —O., —OH, or an alkyl group having 1 to 12 carbon atoms, one or two or more —CH$_2$— groups present in the alkyl group are each independently optionally replaced with —O—, —S—, —CH=CH—, —C≡C—, —CO—, —CO—O—, —O—CO—, —OCF$_2$—, or —CF$_2$O—, $R^2$, $R^3$, $R^4$, and $R^5$ are each independently an alkyl group having 1 to 8 carbon atoms, one or two or more —CH$_2$— groups present in the alkyl group are each independently optionally replaced with —O—, —S—, —CH=CH—, —C≡C—, —CO—, —CO—O—, —O—CO—, —OCF$_2$—, or —CF$_2$O—, $R^2$ and $R^3$ and/or $R^4$ and $R^5$ are taken together to form a ring, $R^6$ and $R^7$ are each independently a hydrogen atom or an alkyl group having 1 to 6 carbon atoms, one or two or more —CH$_2$— groups present in the alkyl group are each independently optionally replaced with —O—, —S—, —CH=CH—, —C≡C—, —CO—, —CO—O—, —O—CO—, —OCF$_2$—, or —CF$_2$O—, $M^1$ is a trivalent organic group, $R^1$, $R^2$, $R^3$, $R^4$, $R^5$, $R^6$ and $R^7$ are optionally the same or different).

In general formula (I), $R^1$ is preferably a hydrogen atom, —O., or —OH, more preferably a hydrogen atom and/or —O—, particularly preferably a hydrogen atom in order to enhance an ability to inhibit photodegradation. To enhance compatibility with the liquid crystal composition, $R^1$ is preferably an unsubstituted alkyl group having 1 to 12 carbon atoms, an alkoxy group having 1 to 12 carbon atoms, or an alkenyl group having 3 to 12 carbon atoms, preferably an unsubstituted alkyl group having 1 to 8 carbon atoms, an alkoxy group having 1 to 8 carbon atoms, or an alkenyl group having 3 to 8 carbon atoms, more preferably an unsubstituted alkyl group having 1 to 4 carbon atoms, an alkoxy group having 1 to 4 carbon atoms, or an alkenyl group having 3 or 4 carbon atoms. In addition, $R^1$ is preferably linear.

$R^2$, $R^3$, $R^4$, and $R^5$ are each independently preferably an alkyl group having 1 to 4 carbon atoms, preferably an unsubstituted alkyl group, preferably linear. More preferably, one or more of $R^2$, $R^3$, $R^4$, and $R^5$ are each a methyl group. Particularly preferably, each of $R^2$, $R^3$, $R^4$, and $R^5$ is a methyl group. $R^2$ and $R^3$ and/or $R^4$ and $R^5$ may be taken together to form a ring structure. When the ring structure is formed, a five- or six-membered ring is preferred. $R^6$ and $R^7$ are each preferably a hydrogen atom or an alkyl group having 1 to 4 carbon atoms, particularly preferably a hydrogen atom.

$M^1$ may be a trivalent organic group. To enhance compatibility with the liquid crystal composition and storage stability, $M^1$ is preferably a structure represented by general formula (I-M):

[Chem. 4]

(I-M)

(where in the formula, $Z^1$, $Z^2$, and $Z^3$ are each independently —O—, —S—, —CH=CH—, —C≡C—, —CO—, —CO—O—, —O—CO—, —OCF$_2$—, —CF$_2$O—, —NH—, or a single bond, Sp$^1$, Sp$^2$, and Sp$^3$ are each independently a single bond or an alkylene group having 1 to 10 carbon atoms, one or two or more —CH$_2$— groups present in the alkylene group may each be independently replaced with —O—, —S—, —CH=CH—, —C≡C—, —CO—, —CO—O—, —O—CO—, —OCF$_2$—, or —CF$_2$O—, and A is a group selected from:

[Chem. 5]

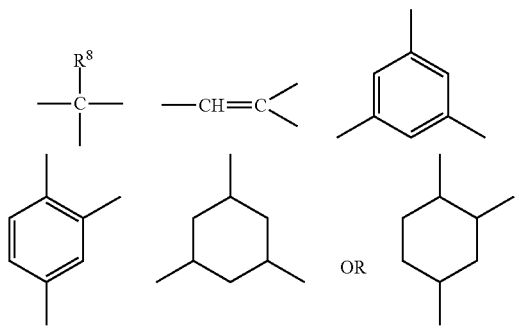

(where in the formulae, $R^8$ is a hydrogen atom, —OH, or an alkyl group having 1 to 10 carbon atoms, one or two or more —CH$_2$— groups present in the alkyl group may each be independently replaced with —O—, —S—, —CH=CH—, —C≡C—, —CO—O—, or —O—CO—, and each of hydrogen atoms in the ring structures may be replaced with a halogen atom or a cyano group)).

At least one or more of $Z^1$, $Z^2$, and $Z^3$ are each preferably —O—, —CO—O—, or a single bond. Particularly preferably, each of $Z^1$, $Z^2$, and $Z^3$ is —O—, —CO—O—, or a single bond. Sp$^1$, Sp$^2$, and Sp$^3$ are each preferably a single bond or an alkylene group having 1 to 10 carbon atoms, preferably a single bond or an alkylene group having 1 to 8 carbon atoms, more preferably a single bond or an alkylene group having 1 to 4 carbon atoms. Preferably, the alkylene group is unsubstituted, or one or two or more —CH$_2$— groups present in the alkylene group are each independently replaced with —O—, —CO—, —CO—O—, or —O—CO—. More preferably, the alkylene group is unsubstituted. Specifically, Sp$^1$, Sp$^2$, and Sp$^3$ are each particularly preferably an unsubstituted alkylene group having 1 to 4 carbon atoms or a single bond.

—Sp$^1$-Z$^1$—, —Sp$^2$-Z$^2$—, and —Sp$^3$-Z$^3$— are each independently preferably —CO—O—, —(CH$_2$)$_n$—CO—O—, —CO—O—(CH$_2$)$_n$—, —(CH$_2$)$_n$—O—, —O—(CH$_2$)$_n$—, —O—CO—O—, —(CH$_2$)$_n$—O—CO—O—, or —O—CO—O—(CH$_2$)$_n$— (where n is an integer of 1 to 4), more preferably —CO—O—, —CH$_2$—CO—O—, or —CH$_2$—CH$_2$—CO—O—.

To enhance compatibility with the liquid crystal composition and the storage stability, A is more preferably a structure represented by:

[Chem. 6]

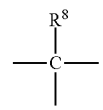

(where in the formula, $R^8$ is a hydrogen atom, —OH, or an alkyl group having 1 to 10 carbon atoms, and one or two or more —CH$_2$— groups present in the alkyl group may each be independently replaced with —O—, —S—, —CH=CH—, —C≡C—, —CO—O—, or —O—CO—). $R^8$ is preferably a hydrogen atom, —OH, an alkyl group having 2 to 10 carbon atoms, —O—CO—R$^9$ (where R$^9$ is an alkyl group having 1 to 9 carbon atoms), particularly preferably a hydrogen atom.

The compound represented by general formula (I) according to the present invention is preferably a compound represented by general formula (I-a):

[Chem. 7]

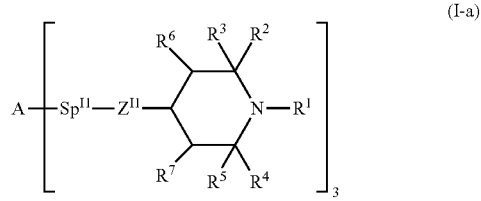

(I-a)

(where in the formula, $R^1$, $R^2$, $R^3$, $R^4$, $R^5$, $R^6$, and $R^7$ are each independently defined the same as $R^1$, $R^2$, $R^3$, $R^4$, $R^5$, $R^6$, and $R^7$ in general formula (I), A is defined the same as A in general formula (I-M), $Z^{J1}$ is —O—, —S—, —CO—, —CO—O—, —O—CO—, —NH—, or a single bond, $Sp^{J1}$ is a single bond or an alkylene group having 1 to 10 carbon atoms, and $R^1$'s, $R^2$'s, $R^3$'s, $R^4$'s, $R^5$'s, $R^6$'s, $R^7$'s, $Z^{J1}$'s, and $Sp^{J1}$'s present in a plurality may be the same or different).

$Z^{J1}$ is preferably —O—, —CO—O—, or a single bond. $Sp^{J1}$ is preferably a single bond or an unsubstituted alkyl group having 1 to 4 carbon atoms and is preferably linear.

The compound represented by general formula (I) or (I-a) is preferably a compound represented by general formula (I-b):

[Chem. 8]

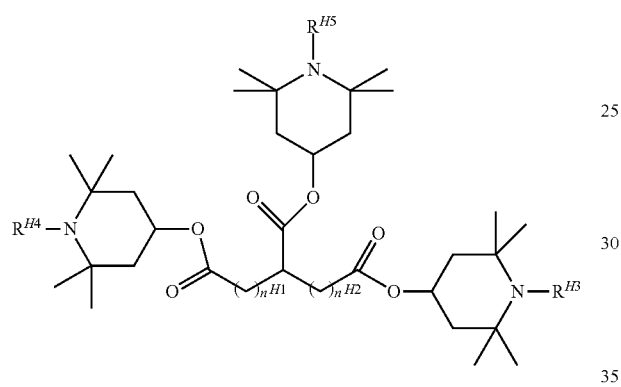

(I-b)

(where in the formula, $R^{H3}$, $R^{H4}$, and $R^{H5}$ are each independently defined the same as $R^1$ in general formula (I), and $n^{H1}$ and $n^{H2}$ are each independently an integer of 0 to 4).

In general formula (I-b), $R^{H3}$, $R^{H4}$, and $R^{H5}$ are each particularly preferably a hydrogen atom. In the case of an alkyl group, the number of carbon atoms is preferably 1 to 8, preferably 1 to 5, preferably 1 to 3, more preferably 1.

Regarding the compounds represented by general formula (I), compounds represented by general formulae (I-1) to (I-14) are preferred, compounds represented by general formulae (I-1) to (I-6) are more preferred, and compounds represented by general formulae (I-1) and (I-2) are particularly preferred.

[Chem. 9]

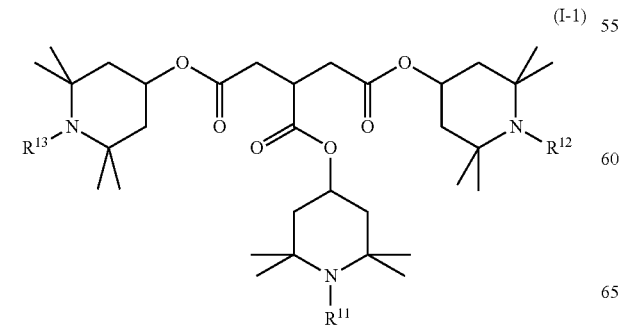

(I-1)

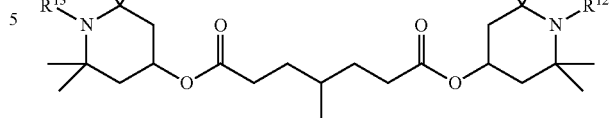

(I-2)

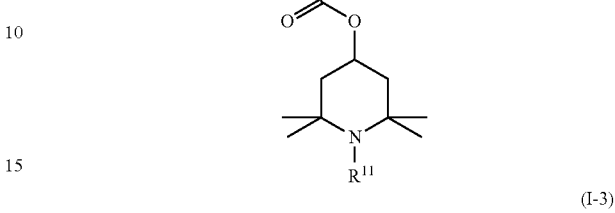

(I-3)

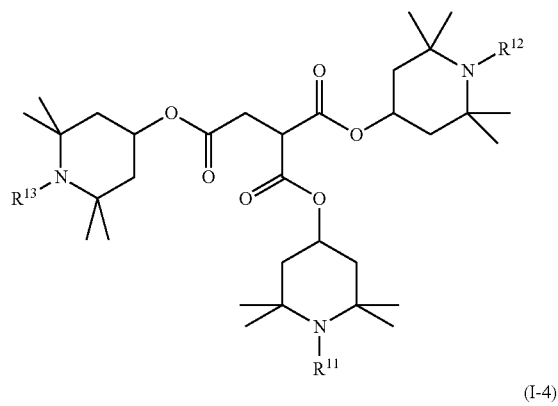

(I-4)

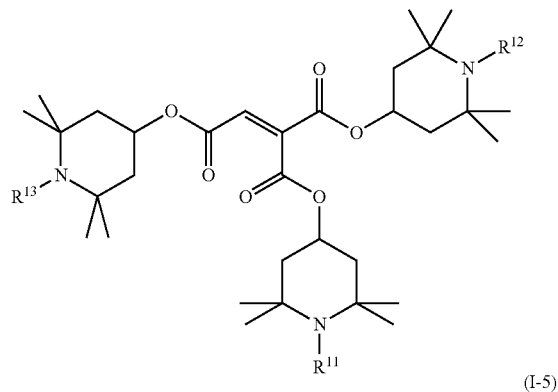

(I-5)

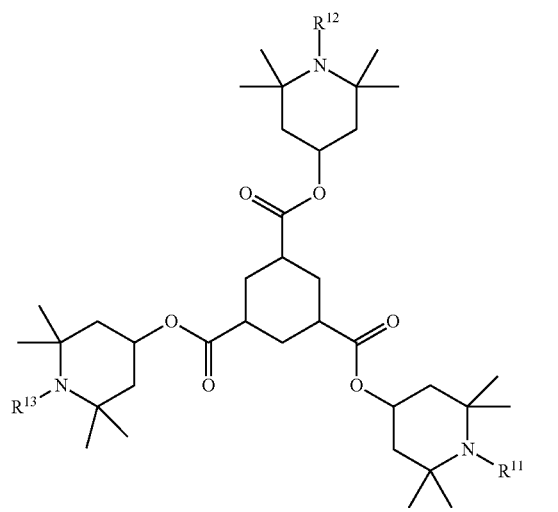

(I-6)
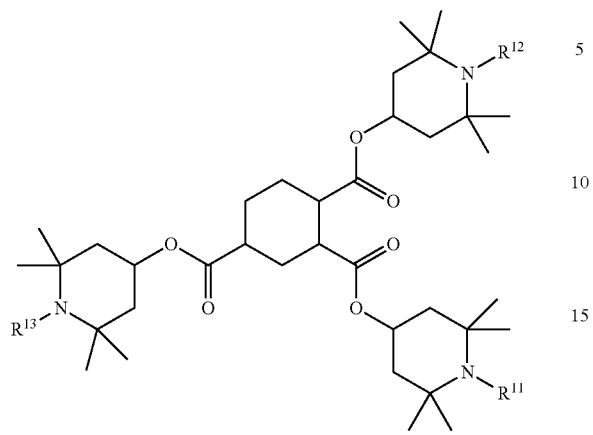
(I-10)
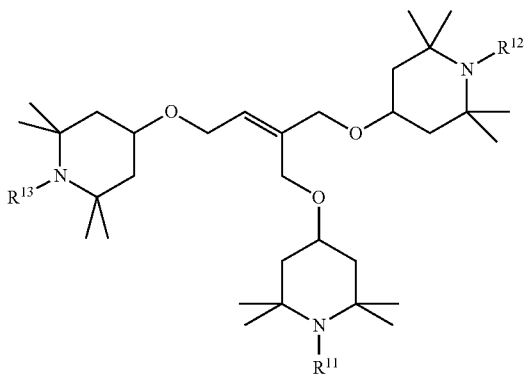
[Chem. 10]
(I-7)
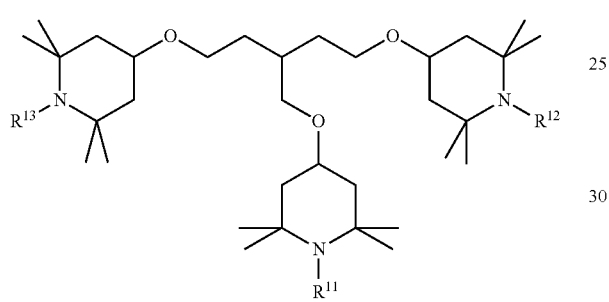
(I-11)
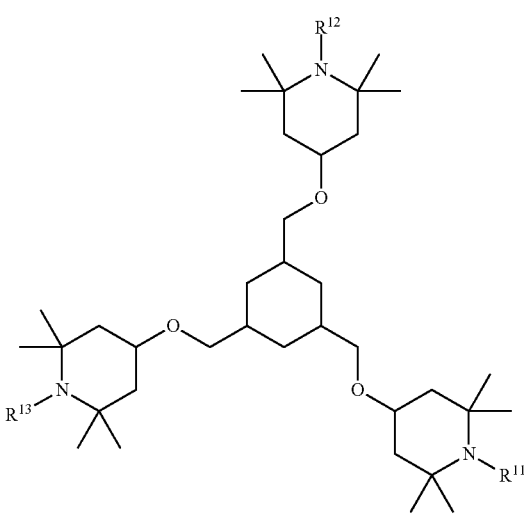
(I-8)
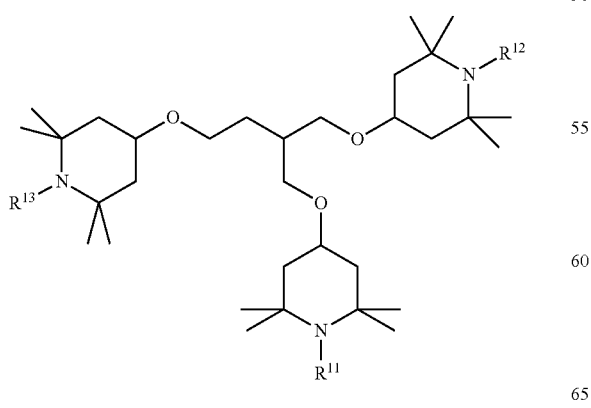
(I-9)
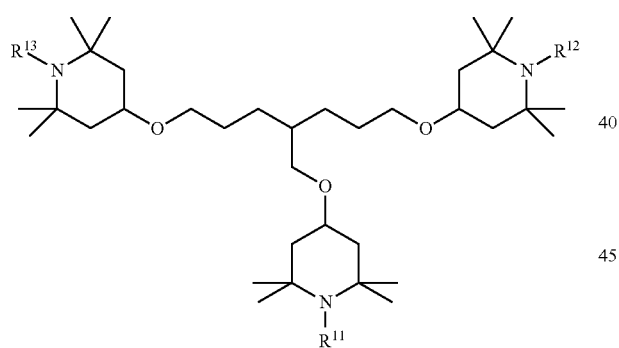
(I-12)
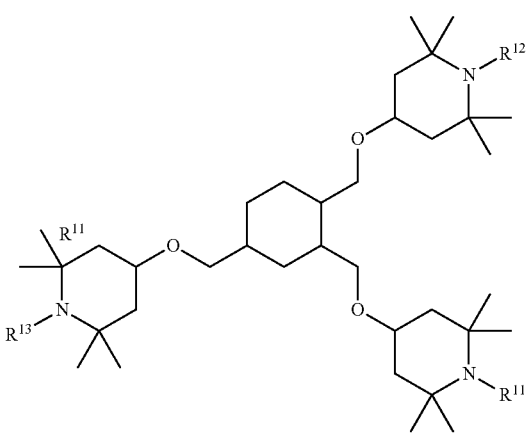

-continued (I-13)

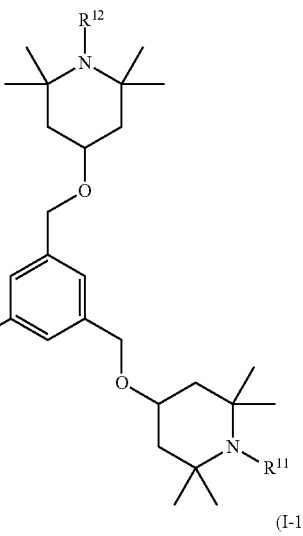

(I-14)

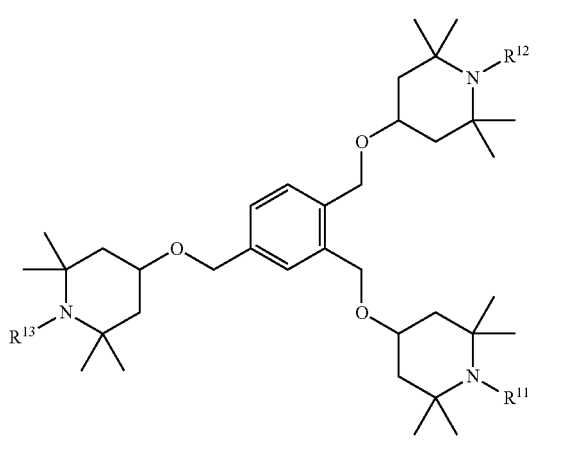

(where in the formulae, $R^{11}$, $R^{12}$, and $R^{13}$ are each independently defined the same as $R^1$ in general formula (I)).

Each of two or more adjacent —CH$_2$— groups present in general formula (I) is not replaced with —O—, —S—, —CO—O—, —O—CO—, —OCF$_2$—, or —CF$_2$O—.

The liquid crystal composition preferably contains the compound represented by general formula (I) in an amount of 0.001 to 5% by mass, preferably 0.005 to 1.0% by mass, more preferably 0.01 to 0.5% by mass, particularly preferably 0.02 to 0.20% by mass. Specifically, when emphasis is placed on the inhibition of precipitation at low temperatures, the content is preferably 0.02 to 0.15% by mass. Two or more compounds represented by general formula (I) may be used in combination. The liquid crystal composition according to the present invention contains, as a second component, one or two or more compounds having positive dielectric anisotropy, the compounds being represented by general formula (J):

[Chem. 11]

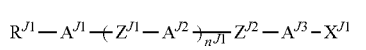

(J)

In general formula (J), $R^{J1}$ is preferably an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably an alkyl group having 1 to 5 carbon atoms, an alkoxy group having 1 to 5 carbon atoms, an alkenyl group having 2 to 5 carbon atoms, or an alkenyloxy group having 2 to 5, more preferably an alkyl group having 1 to 5 carbon atoms or an alkenyl group having 2 to 5 carbon atoms, more preferably an alkyl group having 2 to 5 carbon atoms or an alkenyl group having 2 to 3 carbon atoms, particularly preferably an alkenyl group (propenyl group) having 3 carbon atoms.

When emphasis is placed on reliability, $R^{J1}$ is preferably an alkyl group. When emphasis is placed on a reduction in viscosity, $R^{J1}$ is preferably an alkenyl group.

When a ring structure bonded thereto is a phenyl group (aromatic group), $R^{J1}$ is preferably a linear alkyl group having 1 to 5 carbon atoms, a linear alkoxy group having 1 to 4 carbon atoms, or an alkenyl group having 4 to 5. When the ring structure bonded thereto is a saturated ring structure such as cyclohexane, pyran, or dioxane, $R^{J1}$ is preferably a linear alkyl group having 1 to 5 carbon atoms, a linear alkoxy group having 1 to 4 carbon atoms, or a linear alkenyl group having 2 to 5 carbon atoms. To stabilize a nematic phase, the total number of carbon atoms and, if present, oxygen atoms is preferably 5 or less, and $R^{J1}$ is preferably linear.

The alkenyl group is preferably selected from groups represented by formulae (R1) to (R5) (a black dot in each of the formulae represents a carbon atom in the ring structure bonded to the alkenyl group).

[Chem. 12]

  (R1)

  (R2)

  (R3)

  (R4)

  (R5)

When an increase in Δn is required, $A^{J1}$, $A^{J1}$, and $A^{J3}$ are each independently preferably an aromatic group. To improve the response speed, $A^{J1}$, $A^{J1}$, and $A^{J3}$ are each independently preferably an aliphatic group, preferably a trans-1,4-cyclohexylene group, a 1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group. These groups may be substituted with a fluorine atom. $A^{J1}$, $A^{J1}$, and $A^{J3}$ are more preferably selected from groups represented by the following structures:

[Chem. 13]

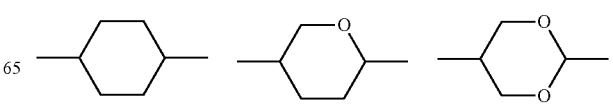

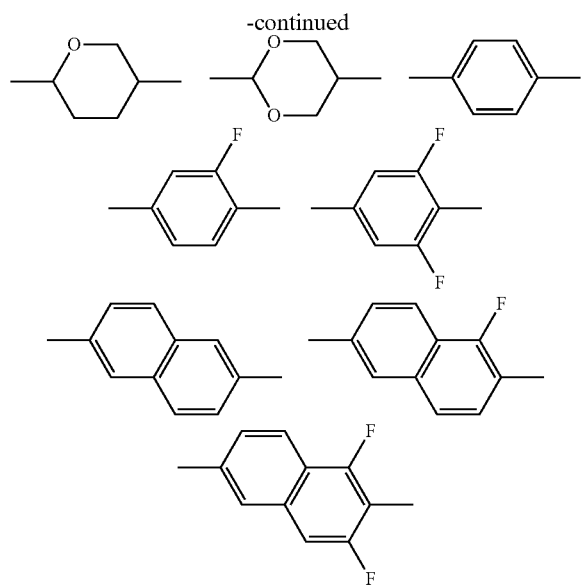

$A^{J1}$, $A^{J2}$, and $A^{J3}$ are more preferably selected from groups represented by the following structures:

[Chem. 14]

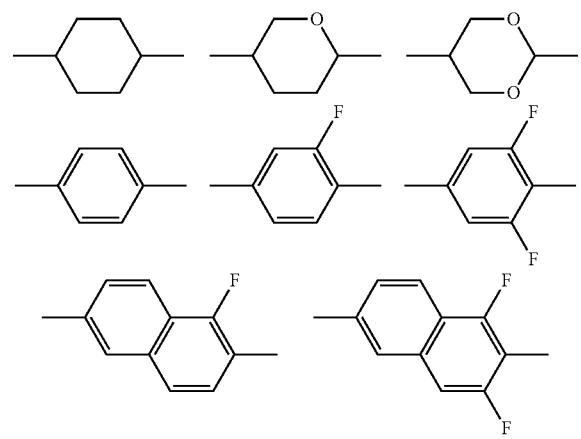

$Z^{J1}$ and $Z^{J2}$ are each independently preferably —CH$_2$O—, —OCH$_2$—, —CF$_2$O—, —CH$_2$CH$_2$—, —CF$_2$CF$_2$—, or a single bond, more preferably —OCH$_2$—, —CF$_2$O—, —CH$_2$CH$_2$—, or a single bond, particularly preferably —OCH$_2$—, —CF$_2$O—, or a single bond.

$X^{J1}$ is preferably a fluorine atom or a trifluoromethoxy group, preferably a fluorine atom.

$n^{J1}$ is preferably 0, 1, 2, or 3, preferably 0, 1, or 2. When emphasis is placed on an improvement in Δε, $n^{J1}$ is preferably 0 or 1. When emphasis is placed on $T_{ni}$, $n^{J1}$ is preferably 1 or 2.

When two or more compounds represented by general formula (J) are used in combination, the types of compounds that can be combined together are not particularly limited. For example, in an embodiment of the present invention, one, two, or three types of compounds are used. In another embodiment of the present invention, four, five, six, or seven or more types of compounds are used.

The content of the compound represented by general formula (J) in the composition of the present invention needs to be appropriately adjusted, depending on performance requirements regarding, for example, low-temperature solubility, transition temperature, electrical reliability, birefringence, process suitability, drop marks, image-sticking, and dielectric anisotropy.

The lower limit of the content of the compound represented by general formula (J) with respect to the total amount of the composition of the present invention is preferably 1%, 10%, 20%, 30%, 40%, 50%, 55%, 60%, 65%, 70%, 75%, or 80%. In an embodiment of the present invention, for example, the upper limit of the content with respect to the total amount of the composition of the present invention is preferably 95%, 85%, 75%, 65%, 55%, 45%, 35%, or 25%.

When the composition of the present invention having a viscosity maintained at a low level and having a high response speed is required, preferably, the lower limit is set to a lower value, and the upper limit is set to a lower value. When the composition of the present invention having $T_{ni}$ maintained at a high level and having high stability to temperature, is required, preferably, the lower limit is set to a lower value, and the upper limit is set to a lower value. When higher dielectric anisotropy is required in order to maintain the driving voltage at a low level, preferably, the lower limit is set to a higher value, and the upper limit is set to a higher value.

When emphasis is placed on reliability, $R^{J1}$ is preferably an alkyl group. When emphasis is placed on a reduction in viscosity, $R^{J1}$ is preferably an alkenyl group.

As the compounds represented by general formula (J), one or two or more compounds represented by general formula (M) are preferably contained:

[Chem. 15]

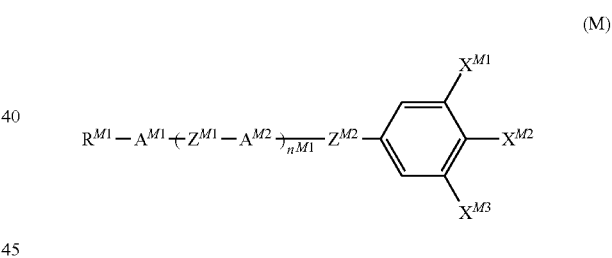

(M)

(where in the formula, $R^{M1}$, $A^{M1}$, $A^{M2}$, $Z^{M1}$, $Z^{M2}$, $n^{M1}$, and $X^{M2}$ are defined the same as $R^{J1}$, $A^{J1}$, $A^{J2}$, $Z^{J1}$, $Z^{J2}$, $n^{J1}$, and $X^{J1}$, respectively, in general formula (J), and $X^{M1}$ and $X^{M3}$ are each independently a hydrogen atom, a chlorine atom, or a fluorine atom).

The content of the compound represented by general formula (M) in the composition of the present invention needs to be appropriately adjusted, depending on performance requirements regarding, for example, low-temperature solubility, transition temperature, electrical reliability, birefringence, process suitability, drop marks, image-sticking, and dielectric anisotropy.

The lower limit of the content of the compound represented by formula (M) with respect to the total amount of the composition of the present invention is preferably 0%, 1%, 10%, 20%, 30%, 40%, 50%, 55%, 60%, 65%, 70%, 75%, or 80%. In an embodiment of the present invention, for example, the upper limit of the content with respect to the total amount of the composition of the present invention is preferably 95%, 85%, 75%, 65%, 55%, 45%, 350, or 25%.

When the composition of the present invention having a viscosity maintained at a low level and having a high response speed is required, preferably, the lower limit is set to a lower value, and the upper limit is set to a lower value. When the composition of the present invention having $T_{ni}$ maintained at a high level and having high stability to temperature is required, preferably, the lower limit is set to a lower value, and the upper limit is set to a lower value. When higher dielectric anisotropy is required in order to maintain the driving voltage at a low level, preferably, the lower limit is set to a higher value, and the upper limit is set to a higher value.

Specifically, the liquid crystal compound represented by general formula (M) is preferably a compound represented by general formula (M-1).

[Chem. 16]

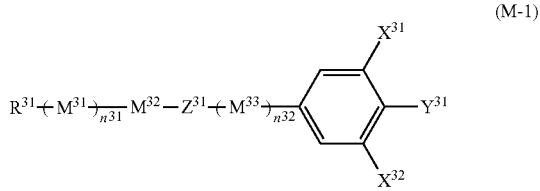

(M-1)

In the formula, $R^{31}$ is an alkyl group having 1 to 10 carbon atoms or an alkenyl group having 2 to 10 carbon atoms, preferably an alkyl group having 2 to 5 carbon atoms or an alkenyl group having 2 to 5 carbon atoms.

When $R^{31}$ is an alkenyl group, $R^{31}$ is preferably selected from groups represented by formulae (R1) to (R5):

[Chem. 17]

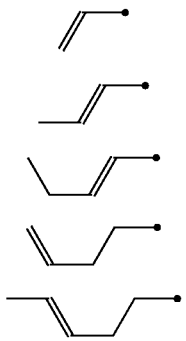

(R1)
(R2)
(R3)
(R4)
(R5)

(where in each of the formulae, a black dot in each of the formulae represents a carbon atom in a ring structure bonded to the alkenyl group).

$M^{31}$ to $M^{33}$ are each independently a trans-1,4-cyclohexylene group or a 1,4-phenylene group. One or two —$CH_2$— groups in the trans-1,4-cyclohexylene group may be replaced with —O— in such a manner that oxygen atoms are not directly adjacent to each other. One or two hydrogen atoms in the phenylene group may each be replaced with a fluorine atom. $M^{31}$ to $M^{33}$ are each independently preferably a trans-1,4-cyclohexylene group, a tetrahydropyran group, a 1,4-dioxane-2,5-diyl group, or a 1,4-phenylene group.

When a plurality of $M^{31}$'s and a plurality of $M^{33}$'s are present, they may be the same or different.

$X^{31}$ and $X^{32}$ are each independently a hydrogen atom or a fluorine atom. $X^{31}$ and $X^{32}$ are each preferably a fluorine atom. $Y^{31}$ is a fluorine atom, a trifluoromethoxy group, or a trifluoromethyl group, preferably a fluorine atom or a trifluoromethoxy group, more preferably a fluorine atom.

$Z^{31}$ is —$CF_2O$—, —$OCH_2$—, or —$CH_2O$—.

$n^{31}$ and $n^{32}$ are each independently 0, 1, or 2. $n^{31}+n^{32}$ is 0, 1, 2, or 3. $n^{31}+n^{32}$ is preferably 1 or 2.

The lower limit of the content of the compound represented by the formula (M-1) with respect to the total amount of the composition of the present invention is preferably 0%, 1%, 10%, 20%, 30%, 40%, 50%, 55%, 60%, 65%, 70%, 75%, or 80%. In an embodiment of the present invention, for example, the upper limit of the content with respect to the total amount of the composition of the present invention is preferably 95%, 85%, 75%, 65%, 55%, 45%, 35%, or 25%.

Specifically, the compound represented by general formula (M-1) is preferably selected from compounds represented by general formulae (M-1-1) and (M-1-2):

[Chem. 18]

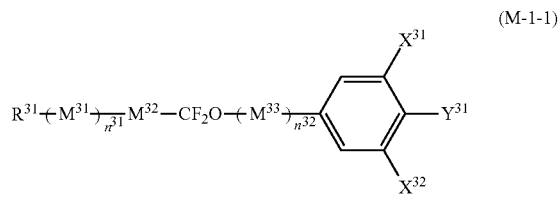

(M-1-1)

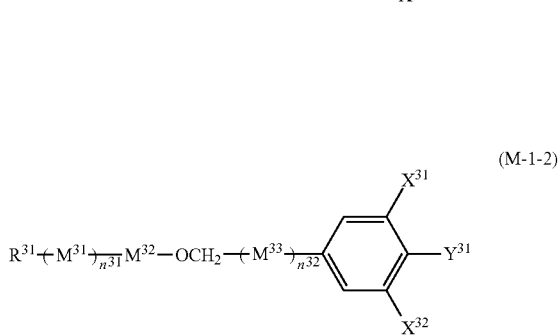

(M-1-2)

The lower limit of the content of the compound represented by the formula (M-1-1) with respect to the total amount of the composition of the present invention is preferably 0%, 1%, 5%, 10%, 15%, 20%, 30%, 40%, or 50%. In an embodiment of the present invention, for example, the upper limit of the content with respect to the total amount of the composition of the present invention is preferably 70%, 65%, 55%, 45%, 40%, 35%, 30%, 25%, 20%, 15%, or 10%.

The lower limit of the content of the compound represented by the formula (M-1-2) with respect to the total amount of the composition of the present invention is preferably 0%, 1%, 5%, 10%, 15%, 20%, 30%, 40%, or 50%. In an embodiment of the present invention, for example, the upper limit of the content with respect to the total amount of the composition of the present invention is preferably 70%, 65%, 55%, 45%, 40%, 35%, 30%, 25%, 20%, 15%, or 10%.

Specifically, the liquid crystal compound represented by general formula (M-1-1) is preferably selected from compounds represented by general formulae (M-1-1a) to (M-1-1f):

[Chem. 19]

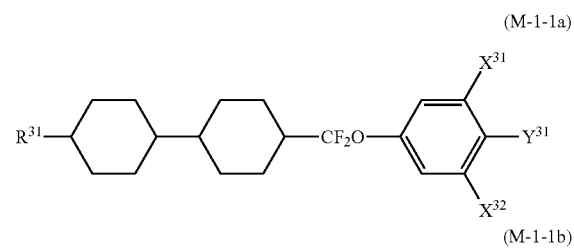
(M-1-1a)

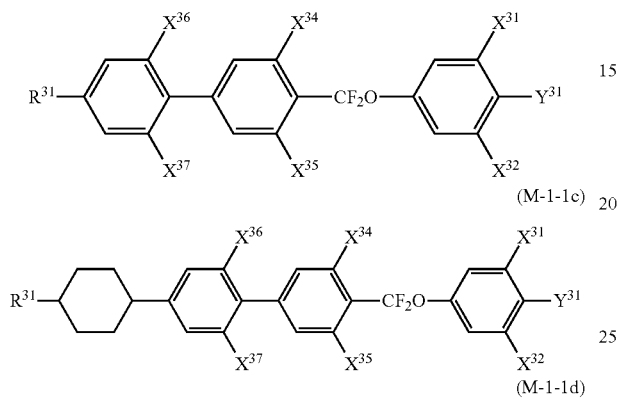
(M-1-1b)
(M-1-1c)
(M-1-1d)

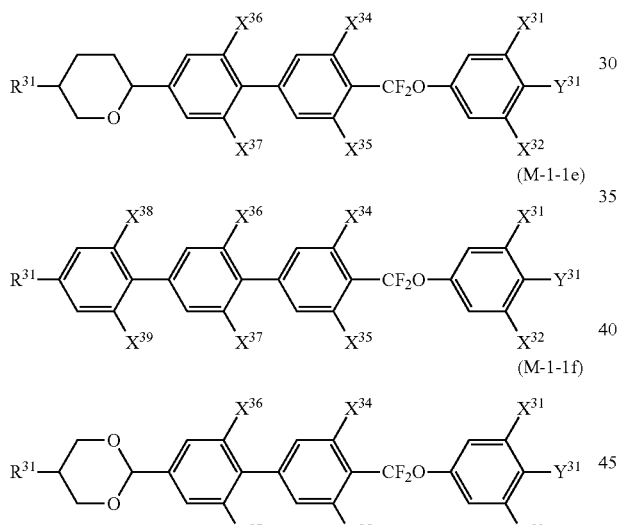
(M-1-1e)
(M-1-1f)

(where in the formulae, $X^{34}$ to $X^{39}$ are each independently a hydrogen atom or a fluorine atom).

The lower limit of the total content of the compounds represented by formulae (M-1-1a) to (M-1-1f) with respect to the total amount of the composition of the present invention is 0%, 1%, 5%, 10%, 15%, 20%, 30%, 40%, or 50%. In an embodiment of the present invention, for example, the upper limit of the content with respect to the total amount of the composition of the present invention is preferably 70%, 65%, 55%, 45%, 40%, 35%, 30%, 25%, 20%, 15%, or 10%.

The lower limit of the total content of the compounds represented by formulae (M-1-1b) and (M-1-1d) to (M-1-1f) with respect to the total amount of the composition of the present invention is preferably 0%, 1%, 5%, 10%, 15%, 20%, 30%, 40%, or 50%. In an embodiment of the present invention, for example, the upper limit of the content with respect to the total amount of the composition of the present invention is preferably 70%, 65%, 55%, 45%, 40%, 35%, 30%, 25%, 20%, 15%, or 10%.

Specifically, the liquid crystal compound represented by general formula (M-1-2) is preferably selected from compounds represented by general formulae (M-1-2a) to (M-1-2n):

[Chem. 20]

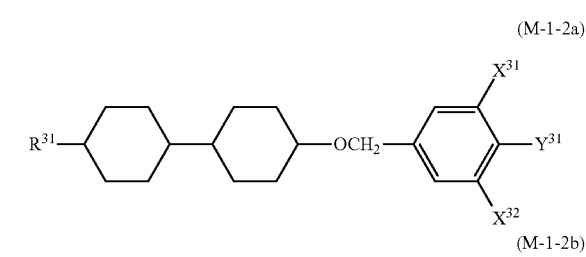
(M-1-2a)
(M-1-2b)

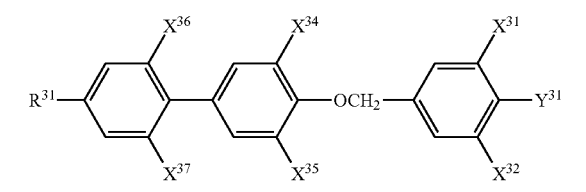
(M-1-2c)

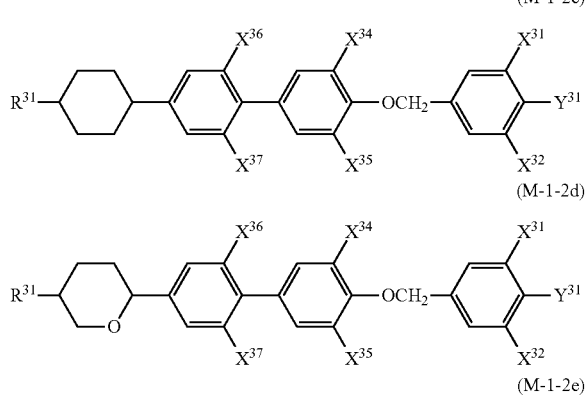
(M-1-2d)
(M-1-2e)

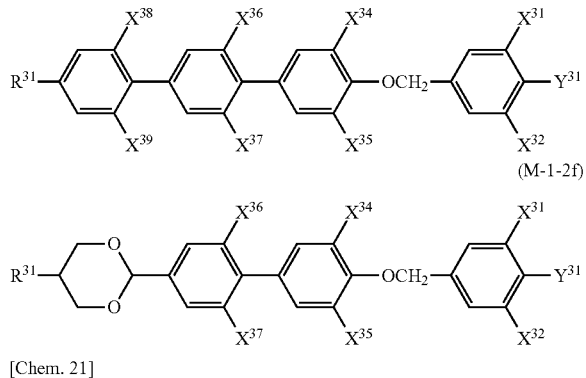
(M-1-2f)

[Chem. 21]

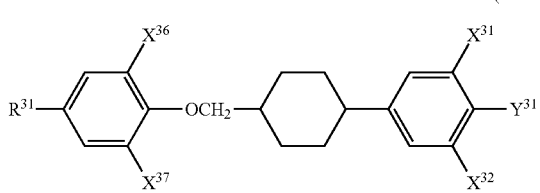
(M-1-2g)

-continued

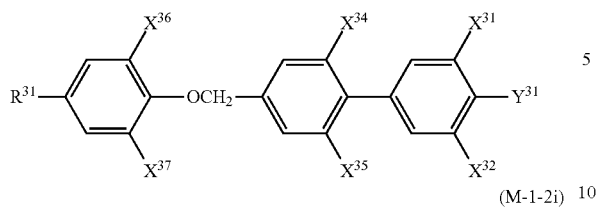
(M-1-2h)

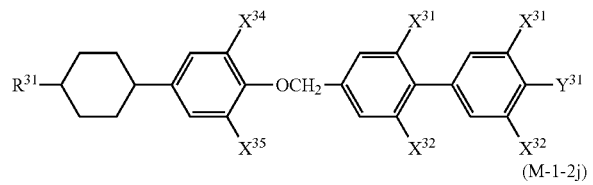
(M-1-2i)

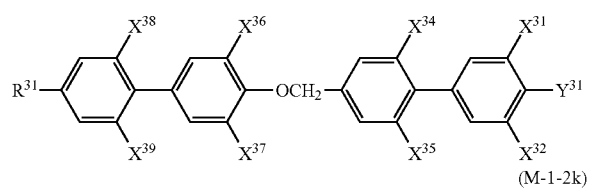
(M-1-2j)

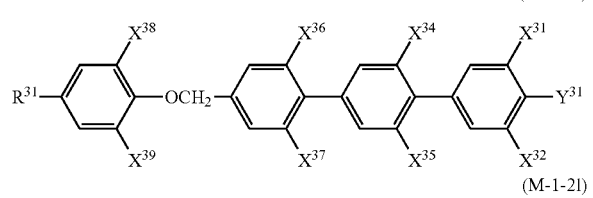
(M-1-2k)

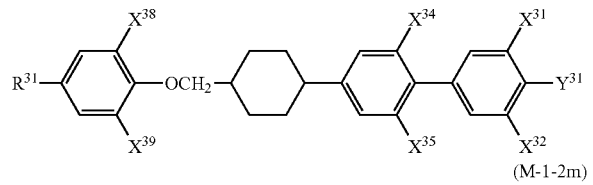
(M-1-2l)

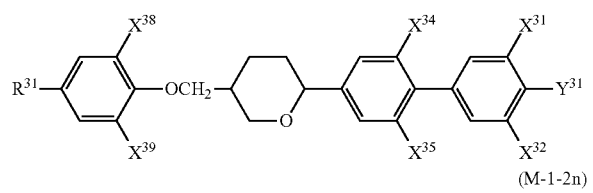
(M-1-2m)

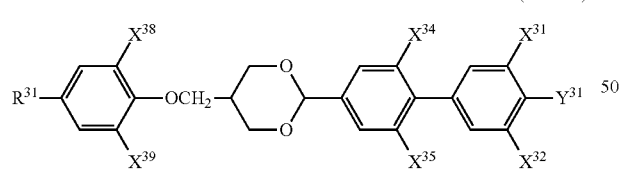
(M-1-2n)

(where in the formulae, $X^{34}$ to $X^{39}$ are each independently a hydrogen atom or a fluorine atom).

The lower limit of the total content of the compounds represented by formulae (M-1-2a) to (M-1-2n) with respect to the total amount of the composition of the present invention is 0%, 1%, 5%, 10%, 15%, 20%, 30%, 40%, or 50%. In an embodiment of the present invention, for example, the upper limit of the content with respect to the total amount of the composition of the present invention is preferably 70%, 65%, 55%, 45%, 40%, 35%, 30%, 25%, 20%, 15%, or 10%.

As the compound represented by general formula (M), a compound represented by (M-2):

[Chem. 22]

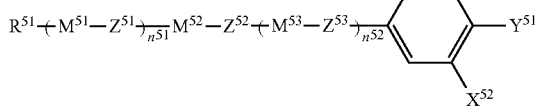
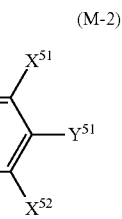

(M-2)

may be contained.

In the formula, $R^{51}$ is an alkyl group having 1 to 10 carbon atoms, an alkoxy group having 1 to 10 carbon atoms, or an alkenyl group having 2 to 10, preferably an alkyl group having 1 to 5, an alkoxy group having 1 to 5, or an alkenyl group having 2 to 5. $X^{51}$ and $X^{52}$ are each independently a hydrogen atom or a fluorine atom. $Y^{51}$ is a fluorine atom, a trifluoromethoxy group, or a trifluoromethyl group. $X^{51}$ is preferably a fluorine atom. $M^{51}$ to $M^{53}$ are each independently a trans-1,4-cyclohexylene group or a 1,4-phenylene group. One or two or more —$CH_2$— groups in the trans-1,4-cyclohexylene group may each be replaced with —O— in such a manner that oxygen atoms are not directly adjacent to each other. One or two hydrogen atoms in the phenylene group may each be replaced with a fluorine atom. $M^{51}$ to $M^{53}$ are each independently preferably a trans-1,4-cyclohexylene group, a tetrahydropyran group, a 1,4-dioxane-2,5-diyl group, or a 1,4-phenylene group, preferably a trans-1,4-cyclohexylene group or a 1,4-phenylene group. $Z^{51}$ to $Z^{53}$ are each independently a single bond or —$CH_2CH_2$—. Two of $Z^{51}$ to $Z^{53}$ are each preferably a single bond. More preferably, each of $Z^{51}$ to $Z^{53}$ is a single bond. $n^{51}$ and $n^{52}$ are each independently 0, 1, or 2. $n^{51}+n^{52}$ is 0, 1, or 2. $n^{51}+n^{52}$ is preferably 1 or 2. When $M^{51}$'s, $M^{53}$'s, $Z^{51}$'s, and $Z^{53}$'s are present in a plurality, they may be the same or different.

Specific examples of the compound represented by general formula (M-2) include compounds represented by general formulae (M-2-1) to (M-2-26):

[Chem. 23]

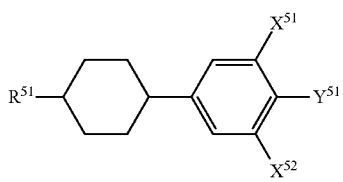
(M-2-1)

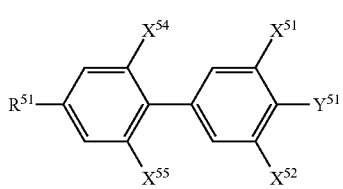
(M-2-2)

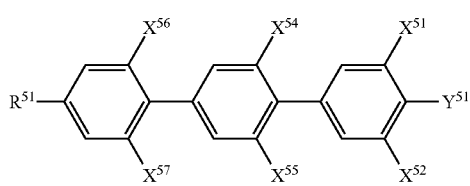
(M-2-3)

-continued
(M-2-4)
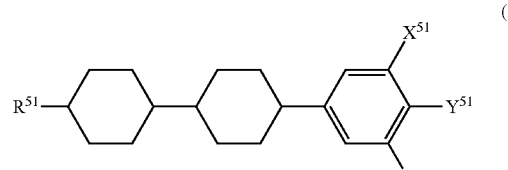
(M-2-5)
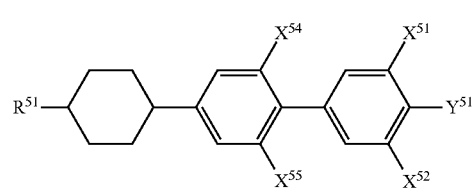
(M-2-6)
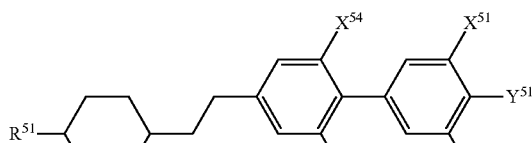
(M-2-7)
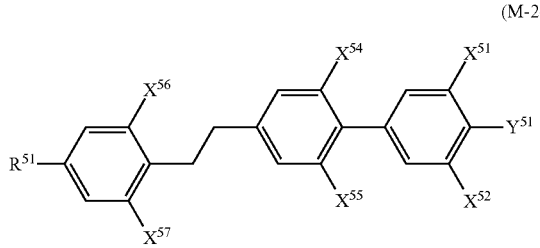
(M-2-8)
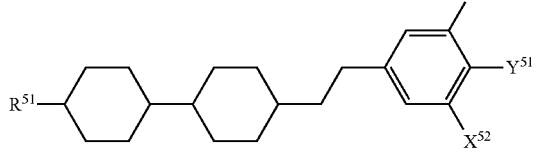
(M-2-9)
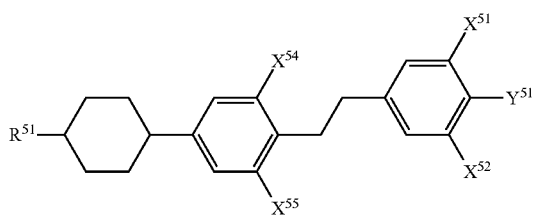
(M-2-10)
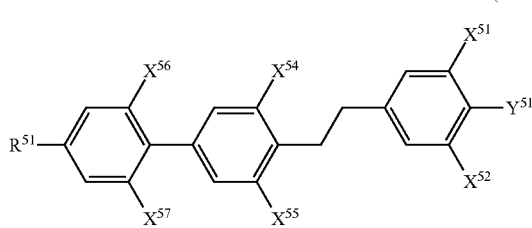
-continued
[Chem. 24]
(M-2-11)
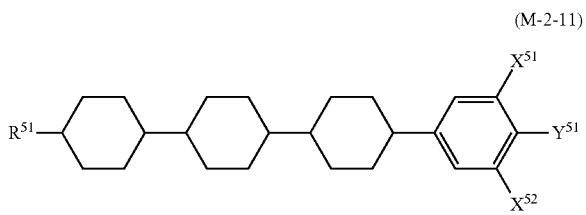
(M-2-12)
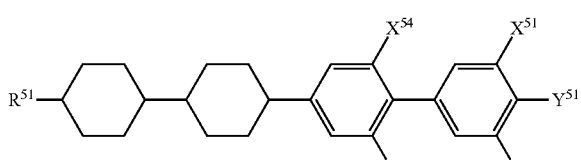
(M-2-13)
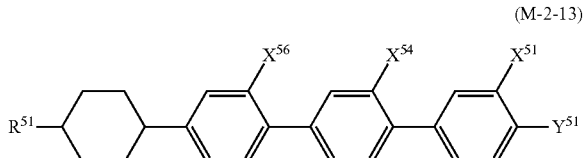
(M-2-14)
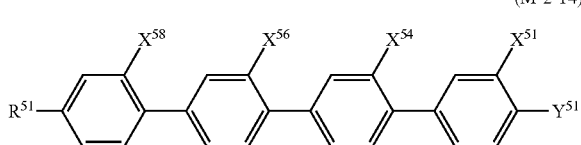
(M-2-15)
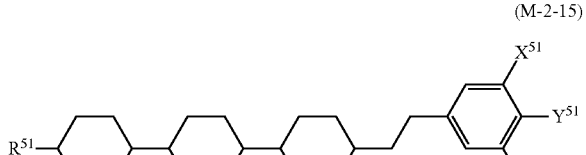
(M-2-16)
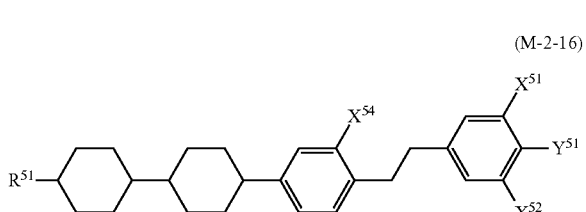
(M-2-17)
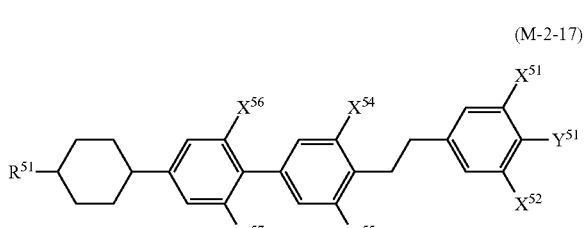

(M-2-18)

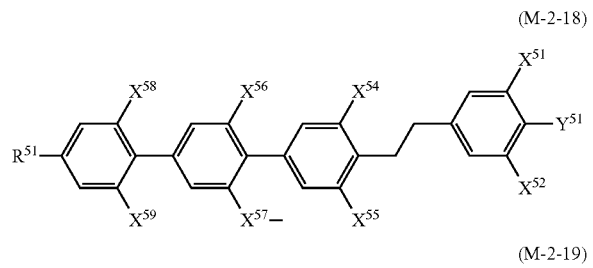

(M-2-19)
(M-2-20)
(M-2-21)

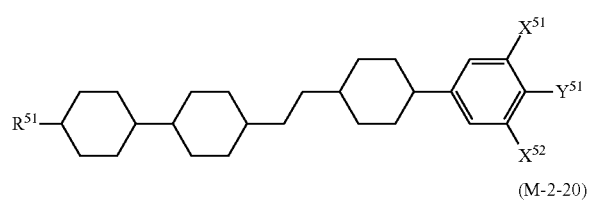

(M-2-22)

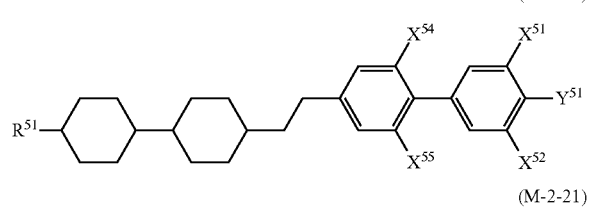

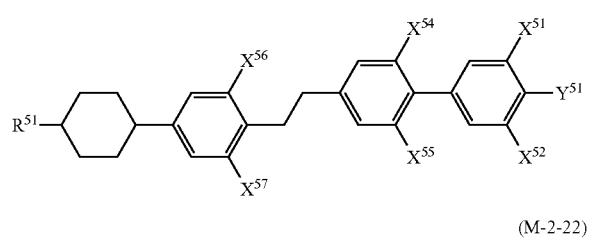

(M-2-23)
(M-2-24)
(M-2-25)

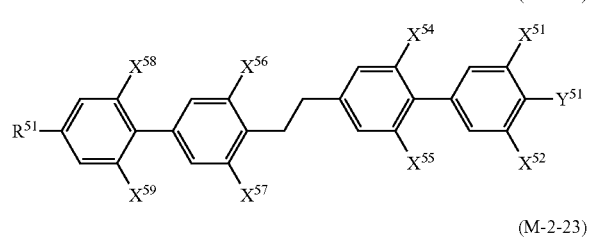

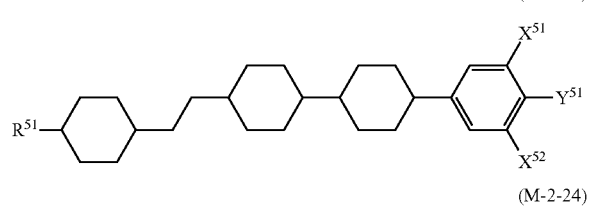

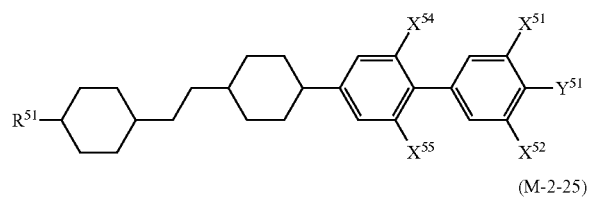

(M-2-26)

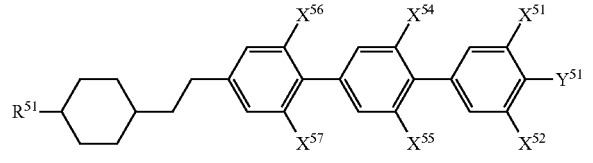

(where in the formulae, $X^{54}$ to $X^{59}$ are each independently a hydrogen atom or a fluorine atom).

The lower limit of the compound represented by general formula (M-2) is 0%, 1%, 5%, 10%, 15%, 20%, 30%, 40%, or 50%. In an embodiment of the present invention, for example, the upper limit of the content with respect to the total amount of the composition of the present invention is preferably 50%, 45%, 40%, 35%, 30%, 25%, 20%, 15%, or 10%.

As the compound represented by general formula (J), one or two or more compounds represented by general formula (K) are preferably contained:

[Chem. 25]

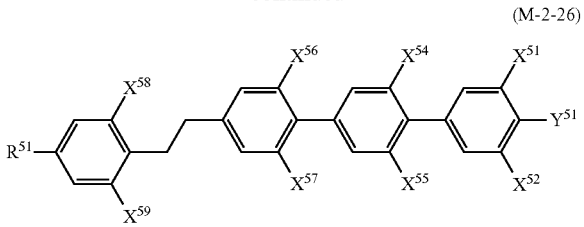

(K)

(where in the formula, $R^{J1}$, $A^{K1}$, $A^{K2}$, $Z^{K1}$, $Z^{K2}$, $n^{K1}$, and $X^{K2}$ are defined the same as $R^{J1}$, $A^{J1}$, $A^{J2}$, $Z^{J1}$, $Z^{J2}$, $n^{J1}$, and $X^{J1}$, respectively, in general formula (J), and $X^{K1}$, $X^{K3}$, and $X^{K4}$ are each independently a hydrogen atom, a chlorine atom, or a fluorine atom).

The content of the compound represented by general formula (K) in the composition of the present invention needs to be appropriately adjusted, depending on performance requirements regarding, for example, low-temperature solubility, transition temperature, electrical reliability, birefringence, process suitability, drop marks, image-sticking, and dielectric anisotropy.

The lower limit of the content of the compound represented by general formula (K) with respect to the total amount of the composition of the present invention is preferably 1%, 10%, 20%, 30%, 40%, 50%, 55%, 60%, 65%, 70%, 75%, or 80%. In an embodiment of the present invention, for example, the upper limit of the content with respect to the total amount of the composition of the present invention is preferably 95%, 85%, 75%, 65%, 55%, 45%, 35%, or 25%.

When the composition of the present invention having a viscosity maintained at a low level and having a high response speed is required, preferably, the lower limit is set to a lower value, and the upper limit is set to a lower value. When the composition of the present invention having $T_{ni}$ maintained at a high level and having high stability to temperature is required, preferably, the lower limit is set to a lower value, and the upper limit is set to a lower value. When higher dielectric anisotropy is required in order to maintain the driving voltage at a low level, preferably, the lower limit is set to a higher value, and the upper limit is set to a higher value.

Specifically, the liquid crystal compound represented by general formula (K) is preferably selected from general formulae (K-1) and (K-2).

[Chem. 26]

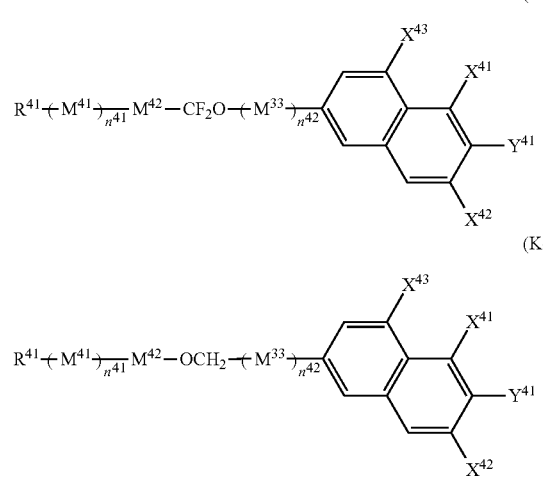

(where in each of the formulae, $R^{41}$ is an alkyl group having 1 to 10 carbon atoms, an alkenyl group having 2 to 10 carbon atoms, or an alkoxy group having 1 to 10 carbon atoms, $X^{41}$, $X^{42}$, and $X^{43}$ are each independently a hydrogen atom or a fluorine atom, $Y^{41}$ is a fluorine atom or $OCF_3$, $M^{41}$ to $M^{43}$ are each independently a trans-1,4-cyclohexylene group or a 1,4-phenylene group, one or two —$CH_2$— groups in the trans-1,4-cyclohexylene group may be replaced with in such a manner that oxygen atoms are not directly adjacent to each other, one or two hydrogen atoms in the phenylene group may each be replaced with a fluorine atom, $n^{41}$ and $n^{42}$ are each independently 0, 1, or 2, and $n^{41}+n^{42}$ is 1, 2, or 3).

Specifically, the liquid crystal compound represented by general formula (K-1) is preferably selected from compounds represented by general formulae (K-1-a) to (K-1-d):

[Chem. 27]

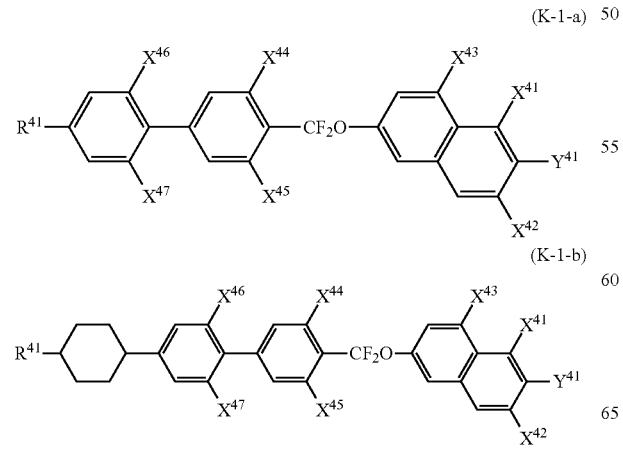

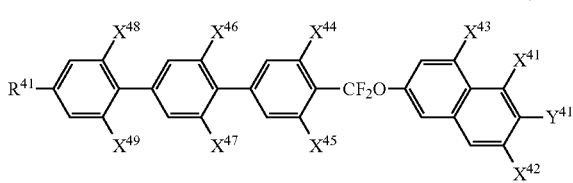

(where in each of the formulae, $X^{44}$ to $X^{49}$ are each independently a hydrogen atom or a fluorine atom).

Specifically, the liquid crystal compound represented by general formula (K-2) is preferably selected from compounds represented by general formulae (K-2-a) to (K-2-g):

[Chem. 28]

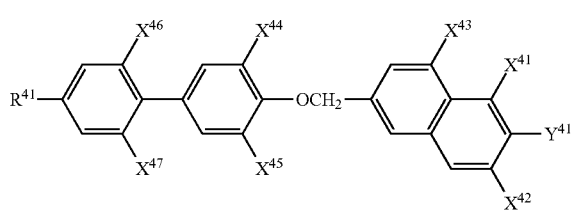

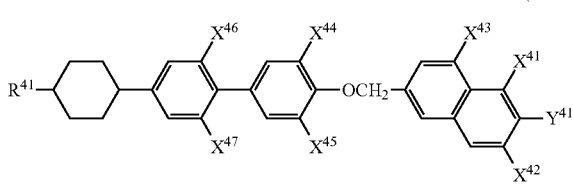

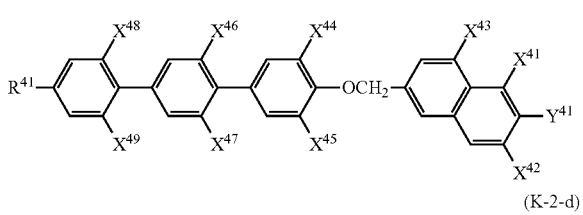

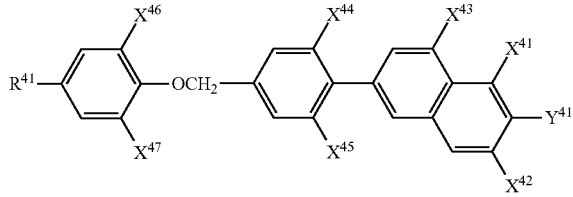

-continued

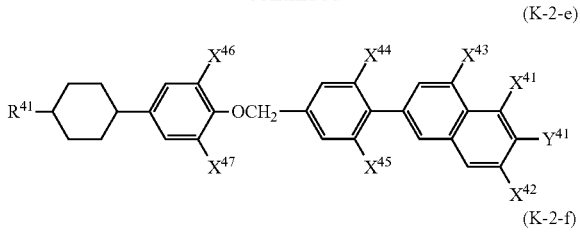
(K-2-e)

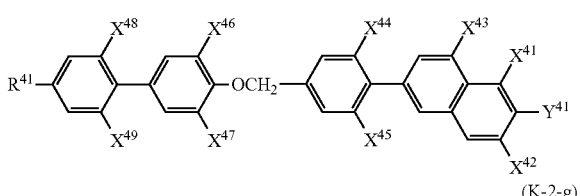
(K-2-f)

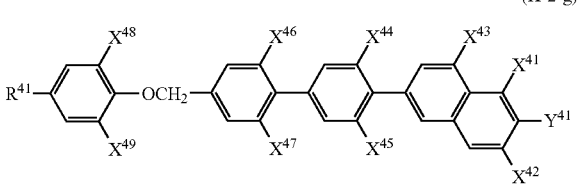
(K-2-g)

(where in each of the formulae, $X^{44}$ to $X^{49}$ are each independently a hydrogen atom or a fluorine atom).

Specifically, the liquid crystal compound represented by general formula (K) is preferably selected from compounds represented by general formulae (K-3) to (K-5):

[Chem. 29]

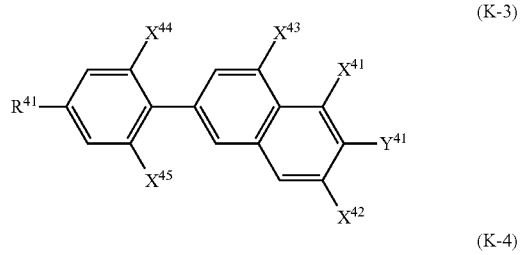
(K-3)

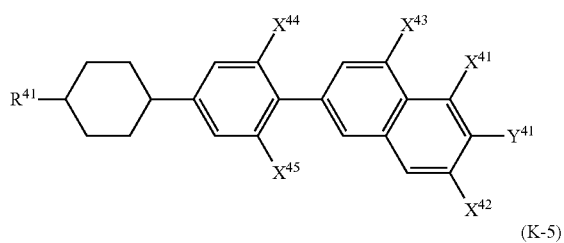
(K-4)

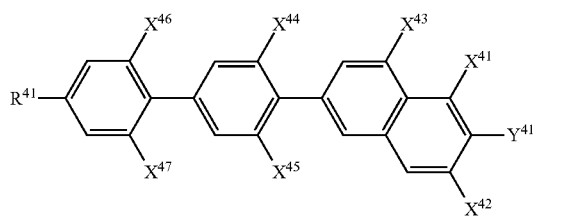
(K-5)

(where in each of the formulae, $R^{41}$, $X^{41}$, $X^{42}$, $X^{43}$, and $Y^{41}$ are defined the same as $R^{K1}$, $X^{K1}$, $X^{K3}$, $X^{K4}$, and $X^{K2}$, respectively, in general formula (K), and $X^{44}$ to $X^{47}$ are each independently a hydrogen atom or a fluorine atom).

The content of the compound, serving as the second component, represented by general formula (J) is preferably 1% by mass to 60% by mass, preferably 5% by mass to 50% by mass, preferably 5% by mass to 40% by mass, preferably 10% by mass to 40% by mass, preferably 10% by mass to 35% by mass, preferably 15% by mass to 35% by mass.

The liquid crystal composition of the present invention preferably contains, as a third component, one or two or more compounds represented by general formula (L), the compound represented by general formula (L) corresponding to an almost dielectrically neutral compound (a Δε value of −2 to 2):

[Chem. 30]

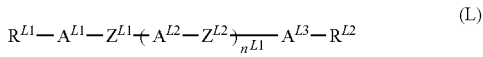
(L)

(where in the formula, $R_{L1}$ and $R^{L2}$ are each independently an alkyl group having 1 to 8 carbon atoms, one —CH$_2$— group or two or more non-adjacent —CH$_2$— groups may each be independently replaced with —CH=CH—, —C≡C—, —O—, —CO—, —COO—, or —OCO—, $n^{L1}$ is 0, 1, 2, or 3, $A^{L1}$, $A^{L2}$, and $A^{L3}$ are each independently a group selected from the group consisting of:

(a) a 1,4-cyclohexylene group (where one —CH$_2$— group or two or more non-adjacent —CH$_2$— groups present in the group may be replaced with —O—), (b) a 1,4-phenylene group (where one —CH= group or two or more non-adjacent —CH= groups present in the group may be replaced with —N=), and (c) a naphthalene-2,6-diyl group, a 1,2,3,4-tetrahydronaphthalene-2,6-diyl group, or a decahydronaphthalene-2,6-diyl group (where one —CH= group or two or more non-adjacent —CH= groups present in the naphthalene-2,6-diyl group or the 1,2,3,4-tetrahydronaphthalene-2,6-diyl group may be replaced with —N=), the groups (a), (b), and (c) may each be independently substituted with a cyano group, a fluorine atom, or a chlorine atom, $Z^{L1}$ and $Z^{L2}$ are each independently a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—, in the case where $n^{L1}$ is 2 or 3 and where a plurality of $A^{L2}$'s are present, $A^{L2}$'s may be the same or different, and in the case where $n^{L1}$ is 2 or 3 and a plurality of $Z^{L3}$'s are present, $Z^{L3}$'s may be the same or different, provided that the compounds represented by general formulae (J) is excluded).

The compounds represented by general formula (L) may be used alone or in combination. The types of compounds that can be used in combination are not particularly limited. These compounds are appropriately combined, depending on performance requirements regarding, for example, low-temperature solubility, transition temperature, electrical reliability, and birefringence. In an embodiment of the present invention, for example, the number of types of compounds used is 1. In another embodiment of the present invention, the number of types of compounds used is 2, 3, 4, 5, 6, 7, 8, 9, or 10 or more.

The content of the compound represented by general formula (L) in the composition of the present invention needs to be appropriately adjusted, depending on performance requirements regarding, for example, low-temperature solubility, transition temperature, electrical reliability, birefringence, process suitability, drop marks, image-sticking, and dielectric anisotropy.

The lower limit of the content of the compound represented by general formula (L) with respect to the total amount of the composition of the present invention is preferably 0%, 1%, 10%, 20%, 30%, 40%, 50%, 55%, 60%, 65%, 70%, 75%, or 80%. The upper limit of the content is preferably 95%, 85%, 75%, 65%, 60%, 55%, 45%, 35%, or 25%.

When the composition of the present invention having a viscosity maintained at a low level and having a high response speed is required, preferably, the lower limit is set to a higher value, and the upper limit is set to a higher value. When the composition of the present invention having $T_{ni}$ maintained at a high level and having high stability to temperature is required, preferably, the lower limit is set to a higher value, and the upper limit is set to a higher value. When higher dielectric anisotropy is required in order to maintain the driving voltage at a low level, preferably, the lower limit is set to a lower value, and the upper limit is set to a lower value.

When emphasis is placed on reliability, preferably, $R^{L1}$ and $R^{L2}$ are each an alkyl group. When emphasis is placed on a reduction in the volatility of the compound, preferably, $R^{L1}$ and $R^{L2}$ are each an alkoxy group. When emphasis is placed on a reduction in viscosity, at least one of $R^{L1}$ and $R^{L2}$ is preferably an alkenyl group.

When each of the ring structures bonded to $R^{L1}$ and $R^{L2}$ is a phenyl group (aromatic group), $R^{L1}$ and $R^{L2}$ are each preferably a linear alkyl group having 1 to 5 carbon atoms, a linear alkoxy group having 1 to 4 carbon atoms, or an alkenyl group having 4 to 5. When each of the ring structures bonded thereto is a saturated ring structure such as cyclohexane, pyran, or dioxane, $R^{L1}$ and $R^{L2}$ are each preferably a linear alkyl group having 1 to 5 carbon atoms, a linear alkoxy group having 1 to 4 carbon atoms, or a linear alkenyl group having 2 to 5 carbon atoms. To stabilize a nematic phase, the total number of carbon atoms and, if present, oxygen atoms is preferably 5 or less, and $R^{L1}$ and $R^{L2}$ are each preferably linear.

The alkenyl group is preferably selected from groups represented by formulae (R1) to (R5) (a black dot in each of the formulae represents a carbon atom in the ring structure.

[Chem. 31]

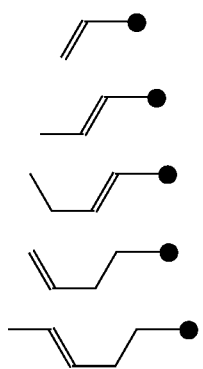

(R1)

(R2)

(R3)

(R4)

(R5)

In particular, the use of a combination of a compound in which at least one or more of $R^{L1}$ and $R^{L2}$ are each an alkenyl group and the compound represented by general formula (I) can significantly inhibits a decrease in voltage holding ratio (VHR).

When emphasis is placed on the response speed, $n^{L1}$ is preferably zero. To improve the upper-limit temperature of the nematic phase, $n^{L1}$ is preferably 2 or 3. To strike a balance therebetween, $n^{L1}$ is preferably 1. To provide a composition that satisfies required properties, a combination of compounds having different $n^{L1}$ values is preferred.

When an increase in Δn is required, $A^{L1}$, $A^{L2}$, and $A^{L3}$ are each independently preferably an aromatic group. To improve the response speed, $A^{L1}$, $A^{L2}$, and $A^{L3}$ are each independently preferably an aliphatic group, preferably a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group. $A^{L1}$, $A^{L2}$, and $A^{L3}$ are more preferably selected from groups represented by the following structures:

[Chem. 32]

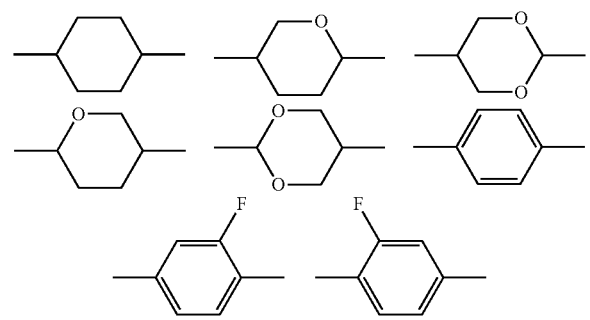

$A^{L1}$, $A^{L2}$, and $A^{L3}$ are more preferably selected from a trans-1,4-cyclohexylene group or a 1,4-phenylene group.

$Z^{L1}$ and $Z^{L2}$ are each preferably a single bond when emphasis is placed on the response speed.

The number of halogen atoms in its molecule is preferably 0 or 1.

As the compound represented by general formula (L), one or two or more compounds represented by general formulae (L-a) to (L-j):

[Chem. 33]

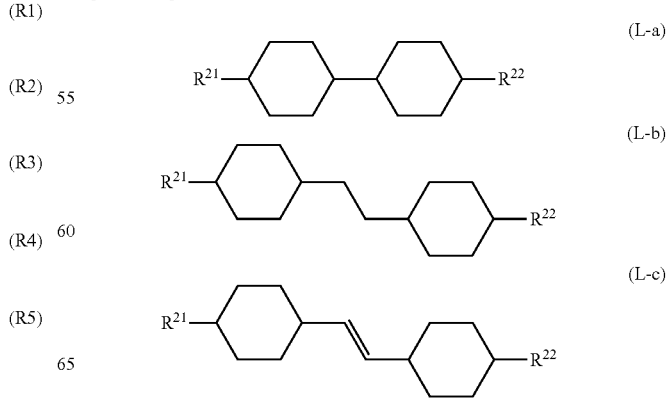

(L-a)

(L-b)

(L-c)

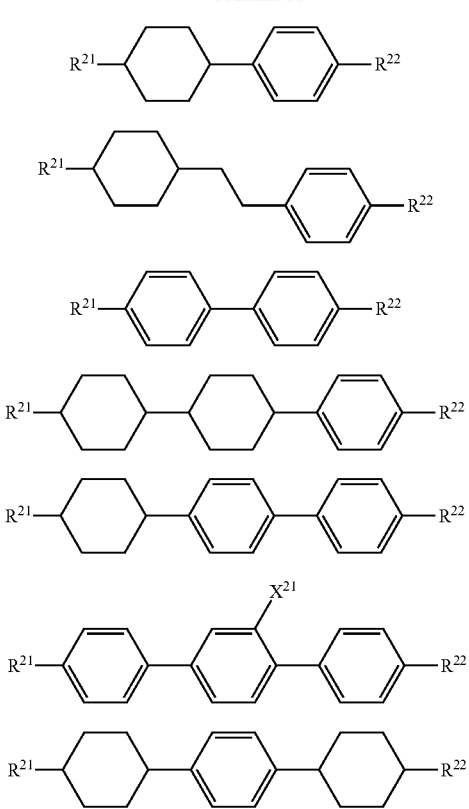

are preferably contained.

The lower limit of the total content of the compounds represented by formulae (L-a) to (L-j) with respect to the total amount of the composition of the present invention is 0%, 1%, 5%, 10%, 15%, 20%, 30%, 40%, or 50%. In an embodiment of the present invention, for example, the upper limit of the content with respect to the total amount of the composition of the present invention is preferably 70%, 65%, 55%, 45%, 40%, 35%, 30%, 25%, 20%, 15%, or 10%.

The lower limit of the total content of the compounds represented by formulae (L-a), (L-f), (L-g), and (L-h) with respect to the total amount of the composition of the present invention is 0%, 1%, 5%, 10%, 15%, 20%, 30%, 40%, or 50%. In an embodiment of the present invention, for example, the upper limit of the content with respect to the total amount of the composition of the present invention is preferably 70%, 65%, 55%, 45%, 40%, 35%, 30%, 25%, 20%, 15%, or 10%.

In each of the formulae, $R^{21}$ and $R^{22}$ are each independently an alkyl group having 1 to 10 carbon atoms, an alkoxy group having 1 to 10 carbon atoms, or an alkenyl group having 2 to 10 carbon atoms. $R^{21}$ and $R^{22}$ are each independently preferably an alkyl group having 1 to 5 carbon atoms, an alkoxy group having 1 to 5 carbon atoms, or an alkenyl group having 2 to 5 carbon atoms. $X^{21}$ is an alkyl group having 1 to 3 carbon atoms, an alkoxy group having 1 to 3 carbon atoms, a fluorine atom, or a hydrogen atom, preferably an alkyl group having 1 carbon atom, a fluorine atom, or a hydrogen atom, more preferably a hydrogen atom or a hydrogen atom.

Among compounds represented by general formulae (L-a) to (L-j), compounds selected from compounds represented by general formulae (L-a), (L-d), (L-f), (L-g), (L-h), and (L-i) are preferred. Compounds selected from compounds represented by general formulae (L-a), (L-f), (L-g), (L-h), and (L-i) are more preferred. Compounds selected from compounds represented by general formulae (L-a), (L-f), and (L-i) are more preferred. Compounds selected from compounds represented by general formulae (L-a) and (L-i) are particularly preferred. The use of a combination of compounds represented by (L-a) is preferred in order to further enhance the effect of the present invention.

Specifically, the compound represented by general formula (L-a) is preferably selected from compounds represented by formulae (L-a-1) to (L-a-10), more preferably compounds represented by formulae (L-a-1), (L-a-5), (L-a-7), (L-a-8), and (L-a-9), particularly preferably compounds represented by formulae (L-a-1) and (L-a-5).

[Chem. 34]

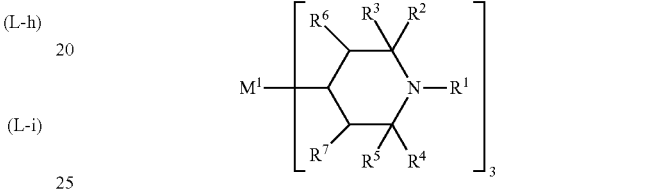

Specifically, the compound represented by general formula (L-a) is preferably selected from compounds represented by formulae (L-a-1) to (L-a-12), preferably compounds represented by formulae (L-a-1) to (L-a-6), particularly preferably compounds represented by formulae (L-a-1) to (L-a-3). Compounds represented by formulae (L-a-1) and (L-a-5) are preferably contained.

The lower limit of the total content of the compounds represented by formulae (L-a-1) and (L-a-5) with respect to the total amount of the composition of the present invention is 0%, 1%, 5%, 10%, 15%, 20%, 30%, 40%, or 50%. In an embodiment of the present invention, for example, the upper limit of the content with respect to the total amount of the composition of the present invention is preferably 70%, 65%, 55%, 45%, 40%, 35%, 30%, 25%, 20%, 15%, or 10%.

Specifically, the compound represented by general formula (L-i) is preferably selected from compounds represented by formulae (L-i-1) to (L-i-12):

[Chem. 35]

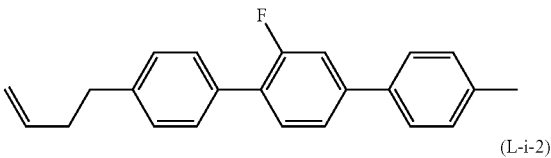

(L-i-1)

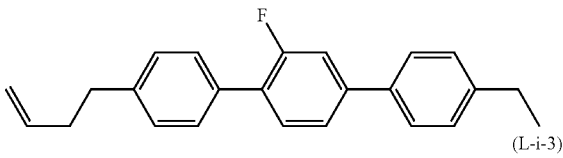

(L-i-2)

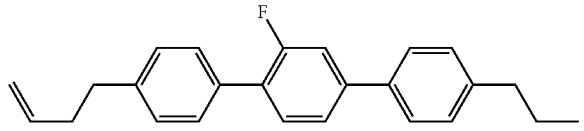

(L-i-3)

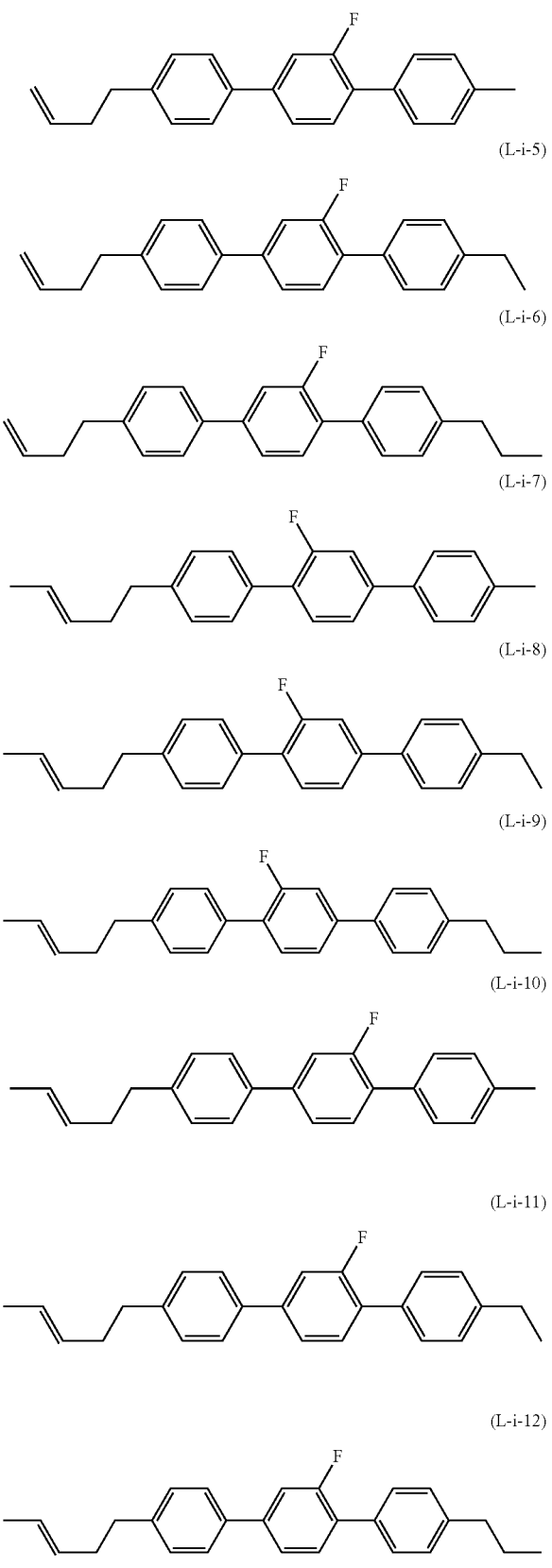

The lower limit of the total content of the compounds represented by formulae (L-i-1) to (L-i-12) with respect to the total amount of the composition of the present invention is 0%, 1%, 5%, 10%, 15%, 20%, or 30%. In an embodiment of the present invention, for example, the upper limit of the content with respect to the total amount of the composition of the present invention is preferably 70%, 65%, 55%, 45%, 40%, 35%, 30%, 25%, 20%, 15%, 10%, 80, or 5%.

The lower limit of the total content of the compound serving as the first component represented by general formula (I), the compound serving as the second component represented by general formula (J), and the compound serving as the third component represented by general formula (L) in the liquid crystal composition of the present invention is 70%, 80%, 85%, 87%, 90%, 93%, 95%, or 97%. In an embodiment of the present invention, for example, the upper limit of the content with respect to the total amount of the composition of the present invention is preferably 100%, 99%, 97%, 95%, 93%, 90%, 87%, or 85%.

The liquid crystal composition of the present invention preferably has a dielectric anisotropy ($\Delta\varepsilon$) of 1.5 to 20.0, more preferably 1.5 to 18.0, more preferably 1.5 to 15.0, more preferably 1.5 to 11, particularly preferably 1.5 to 8 at 25° C.

The liquid crystal composition of the present invention preferably has a dielectric anisotropy ($\Delta\varepsilon$) of +1.5 to 2.5, preferably 3.5 to 8.0, preferably +4.5 to 7.0, preferably +8.5 to 10 at 25° C.

The liquid crystal composition of the present invention has a refractive-index anisotropy ($\Delta n$) of 0.08 to 0.14, more preferably 0.09 to 0.13, particularly preferably 0.09 to 0.12 at 20° C. Specifically, in the case of addressing a small cell gap, the liquid crystal composition preferably has a refractive-index anisotropy ($\Delta n$) of 0.10 to 0.13. In the case of addressing a large cell gap, the liquid crystal composition preferably has a refractive-index anisotropy ($\Delta n$) of 0.08 to 0.10.

The liquid crystal composition of the present invention has a viscosity (i) of 10 to 50 mPa·s, more preferably 10 to 40 mPa·s, particularly preferably 10 to 35 mPa·s at 20° C.

The liquid crystal composition of the present invention has a rotational viscosity ($\gamma_1$) of 60 to 130 mPa·s, more preferably 60 to 110 mPa·s, particularly preferably 60 to 100 mPa·s at 20° C.

The liquid crystal composition of the present invention has a nematic phase-isotropic liquid phase transition temperature ($T_{ni}$) of 60° C. to 120° C., more preferably 70° C. to 100° C., particularly preferably 70° C. to 90° C.

The liquid crystal composition of the present invention may contain one or two or more optically active compounds. Any optically active compound can be used as long as its liquid crystal molecules can be aligned in a twisted configuration. The twist usually varies depending on temperature. To achieve desired temperature dependence, thus, a plurality of optically active compounds may be used. Optically active compounds having a strong twist effect are preferably selected and used in order not to cause harmful effects on, for example, the temperature range and the viscosity of the nematic liquid crystal phase. As the optically active compounds, specifically, liquid crystals such as cholesteryl nonanoate and compounds represented by general formulae (Ch-1) to (Ch-6) are preferred:

[Chem. 36]

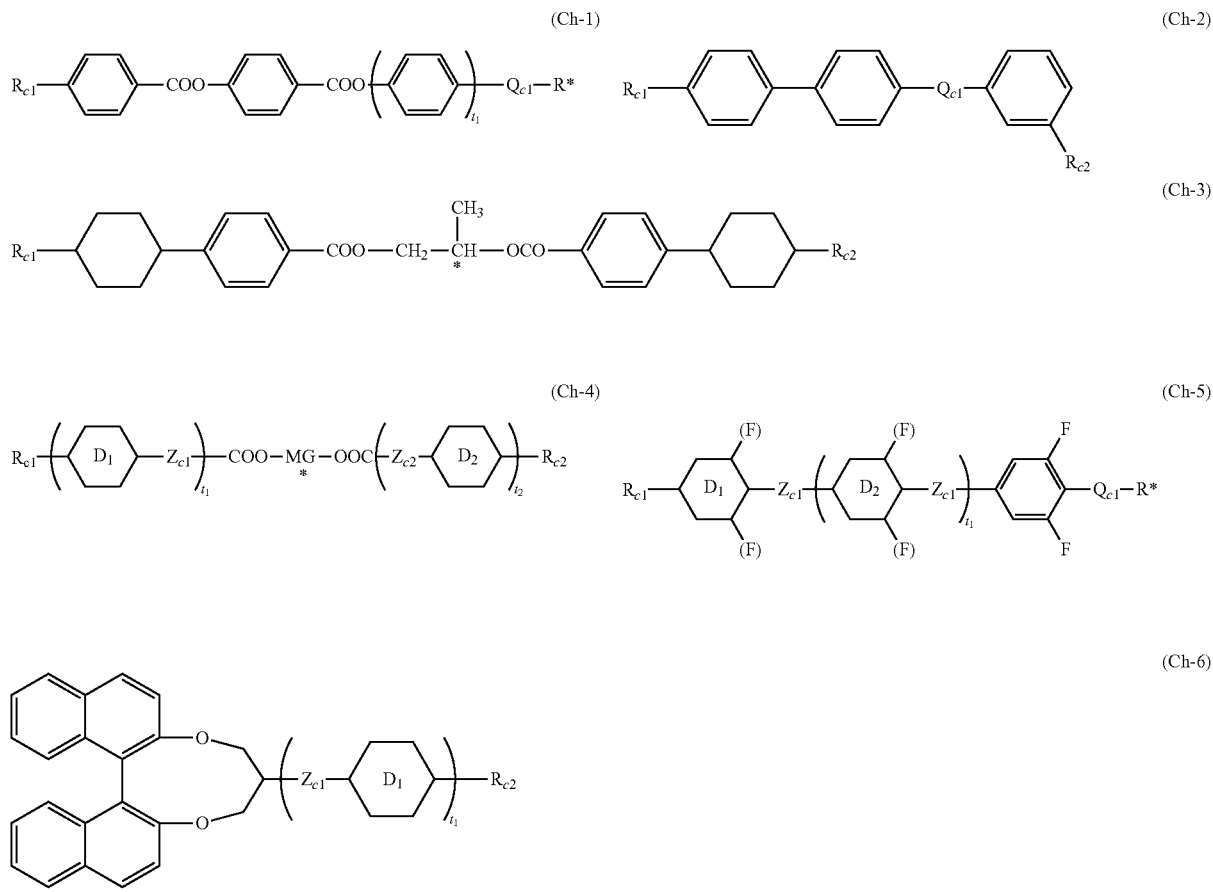

(where in the formulae, $R_{c1}$, $R_{c2}$, and R* are each independently an alkyl group having 1 to 15 carbon atoms, one or two or more —CH$_2$— groups in each alkyl group may each be replaced with —O—, —CH=CH—, —CO—, —OCO—, —COO—, —C≡C—, —CF$_2$O—, or —OCF$_2$— in such a manner that oxygen atoms are not directly adjacent to each other, and one or two or more hydrogen atoms in each alkyl group may each be replaced with a halogen atom, provided that R* has at least one optically active branched-chain group or halogen substituent. $Z_{c1}$ and $Z_{c2}$ are each independently a single bond, —CH=CH—, —C≡C—, —CH$_2$CH$_2$—, —(CH$_2$)$_4$—, —OCO—, —OCO—, —OCH$_2$—, —CH$_2$O—, —OCF$_2$—, or —CF$_2$O—, D$_1$ and D$_2$ are each independently a cyclohexane ring or a benzene ring, one or two or more —CH$_2$— groups in the cyclohexane ring may each be replaced with —O— in such a manner that oxygen atoms are not directly adjacent to each other, one or two or more —CH$_2$CH$_2$— groups in the ring may each be —CH=CH—, —CF$_2$O—, or —OCF$_2$—, one or two or more —CH= groups in the benzene ring may each be replaced with —N= in such a manner that nitrogen atoms are not directly adjacent to each other, one or more hydrogen atoms in the ring may be replaced with F, Cl, or CH$_3$, $t_1$ and $t_2$ are each 0, 1, 2, or 3, and MG*, $Q_{c1}$, and $Q_{c2}$ are selected from the following structures:

[Chem. 37]

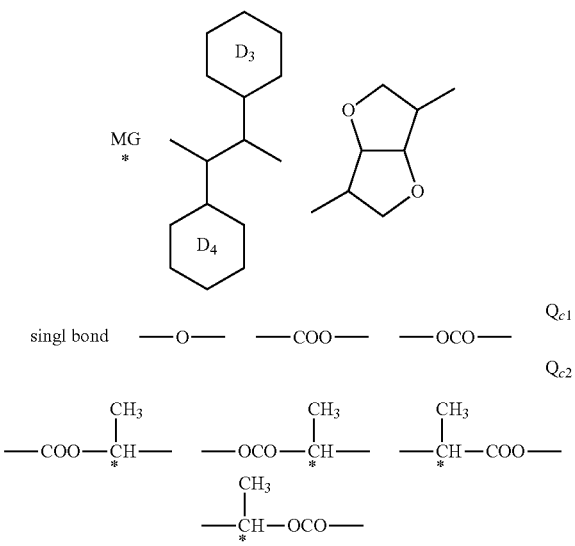

(where in the formulae, D$_3$ and D$_4$ are each a cyclohexane ring or a benzene ring, one or two or more —CH$_2$— groups in the cyclohexane ring may each be replaced with —O— in such a manner that oxygen atoms are not directly adjacent to each other, one or two or more —CH$_2$CH$_2$— groups in the ring may each be replaced with —CH=CH—, —CF$_2$O—, or —OCF$_2$—, one or two or more —CH= groups in the benzene ring may each be replaced with —N= in such a manner that nitrogen atoms are not directly adjacent to each other, and one or more hydrogen atoms in the ring may be replaced with F, Cl, or CH$_3$).

The liquid crystal composition of the present invention may contain one or two or more polymerizable compounds. The polymerizable compound is preferably a discotic liquid crystal compound having a structure including a core located at the center of its molecule and side chains of the core, the core being composed of a benzene derivative, a triphenylene derivative, a truxene derivative, a phthalocyanine derivative, or a cyclohexane derivative, the side chains being composed of a linear alkyl group, a linear alkoxy group, or a substituted benzoyloxy group and extending radially.

Specifically, the polymerizable compound is preferably a polymerizable compound represented by general formula (PC):

[Chem. 38]

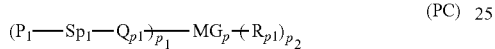

(PC)

(where in the formula, P$_1$ is a polymerizable functional group, Sp$_1$ is a spacer group having 0 to 20 carbon atoms, Q$_{p1}$ is a single bond, —O—, —NH—, —NHCOO—, —OCONH—, —CH=CH—, —CO—, —COO—, —OCO—, —OCOO—, —OOCO—, —CH=CH—, —CH=CH—COO—, —OCO—CH=CH—, or —C≡C—, p$_1$ and p$_2$ are each independently 1, 2, or 3, MG$_p$ is a mesogenic group or a mesogenic supporting group, R$_{p1}$ is a halogen atom, a cyano group, or an alkyl group having 1 to 25 carbon atoms, and one or two or more CH$_2$ groups in the alkyl group may each be replaced with —O—, —S—, —NH—, —N(CH$_3$)—, —CO—, —COO—, —OCO—, —OCOO—, —SCO—, —COS—, or —C≡C— in such a manner that oxygen atoms are not directly adjacent to each other. R$_{p1}$ may be P$_2$—Sp$_2$-Q$_{p2}$-, where P$_2$, Sp$_2$, and Q$_{p2}$ are defined the same as P$_1$, Sp$_1$, and Q$_{p1}$, respectively).

More preferably, the polymerizable compound represented by general formula (PC) is a polymerizable compound in which MG$_p$ has the following structure:

[Chem. 39]

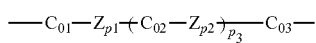

(where in the formula, C$_{01}$ to C$_{03}$ are each independently a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene 2,7-diyl group, or a fluorene 2,7-diyl group, a 1,4-phenylene group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene 2,7-diyl group, and a fluorene-2,7-diyl group may have one or more F atoms, Cl atoms, CF$_3$ groups, OCF$_3$ groups, cyano groups, alkyl groups having 1 to 8 carbon atoms, alkoxy groups, alkanoyl groups, alkanoyloxy groups, alkenyl groups having 2 to 8 carbon atoms, alkenyloxy groups, alkenoyl groups, or alkenoyl groups serving as substituents, Z$_{p1}$ and Z$_{p2}$ are each independently —COO—, —OCO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, or a single bond, and p$_3$ is 0, 1, or 2).

When Sp$^1$ and Sp$^2$ are each independently an alkylene group, the alkylene group may be substituted with one or more halogen atoms or CN groups, and one or two or more CH$_2$ groups present in the group may each be replaced with —O—, —S—, —NH—, —N(CH$_3$)—, —CO—, —COO—, —OCO—, —OCOO—, —SCO—, —COS—, or —C≡C— in such a manner that oxygen atoms are not directly adjacent to each other. P$_1$ and P$_2$ are each independently preferably any of general formulae:

[Chem. 40]

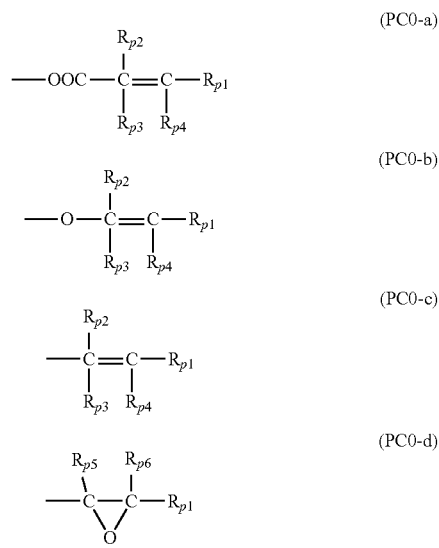

(where in the formulae, R$_{p2}$ to R$_{p6}$ are each independently a hydrogen atom, a hydrogen atom, or an alkyl group having 1 to 5 carbon atoms).

More specifically, the polymerizable compound represented by general formula (PC) is preferably selected from polymerizable compounds represented by general formulae (PC0-1) to (PC0-6):

[Chem. 41]

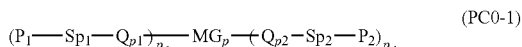

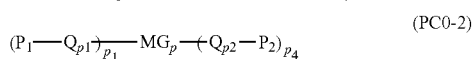

-continued $$P_1—Sp_1—Q_{p1}—MG_p—Q_{p2}—Sp_2—P_2 \quad (PC0\text{-}3)$$

$$P_1—Q_{p1}—MG_p—Q_{p2}—P_2 \quad (PC0\text{-}4)$$

$$P_1—Sp_1—Q_{p1}—MG_p—R_{p1} \quad (PC0\text{-}5)$$

$$P_1—Q_{p1}—MG_p—R_{p1} \quad (PC0\text{-}6)$$

(where in the formulae, $p_4$'s are each independently 1, 2, or 3). More specifically, polymerizable compounds represented by general formulae (PC1-1) to (PC1-9) are preferred:

(where in the formulae, $p_5$ is 0, 1, 2, 3, or 4). $Sp_1$, $Sp_2$, $Q_{p1}$, and $Q_{p2}$ are each preferably a single bond, $P_1$ and $P_2$ are each preferably formula (PC0-a), more preferably an acryloyloxy group or a methacryloyloxy group, $p_1+p_4$ is preferably 2, 3, or 4, and $R_{p1}$ is preferably H, F, $CF_3$, $OCF_3$, $CH_3$, or $OCH_3$. Furthermore, compounds represented by general formulae (PC1-2), (PC1-3), (PC1-4), and (PC1-8) are preferred.

A discotic liquid crystal compound in which $MG_p$ in general formula (PC) is represented by general formula (PC1)-9 is also preferred:

[Chem. 42]

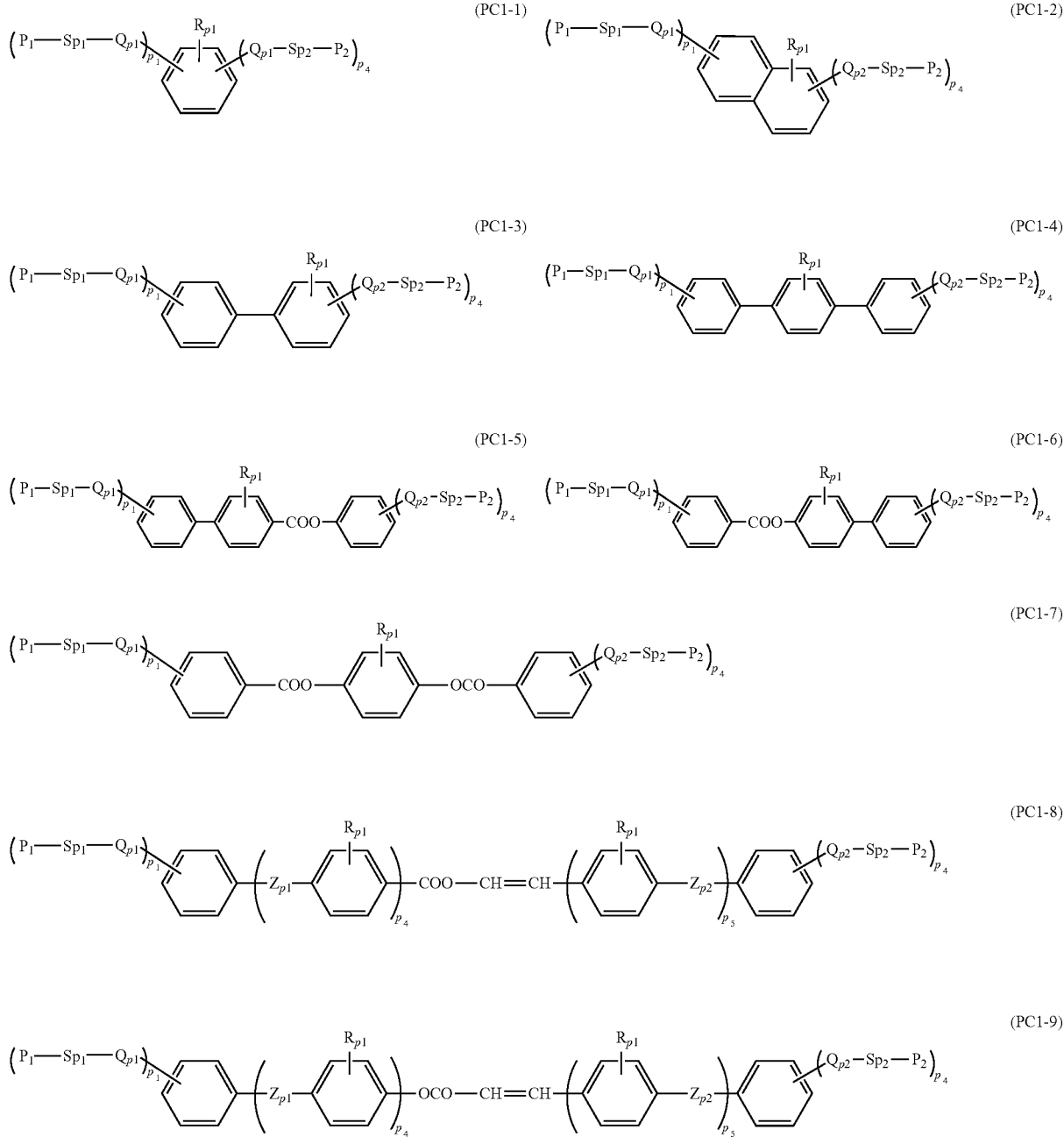

(PC1)-9

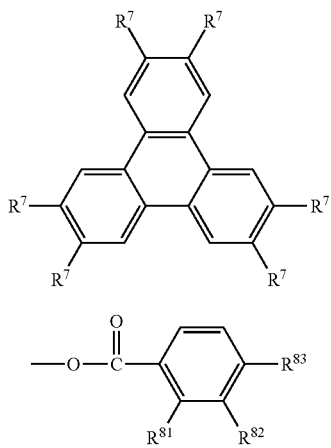

(PC1-e)

(where in the formulae, $R^7$'s are each independently $P_1$—$Sp_1$-$Q_{p1}$ or a substituent represented by general formula (PC1-e), $R^{81}$ and $R^{82}$ are each independently a hydrogen atom, a halogen atom, or a methyl group, $R^{83}$ is an alkoxy group having 1 to 20, and at least one hydrogen atom in the alkoxy group is replaced with the substituent represented by any of general formulae (PC0-a) to (PC0-d)).

The amount of the polymerizable compound used is preferably 0.05 to 2.0% by mass.

The liquid crystal composition of the present invention may further contain one or two or more antioxidants and one or two or more UV absorbers. The antioxidants are preferably selected from compounds represented by general formulae (E-1) and (E-2):

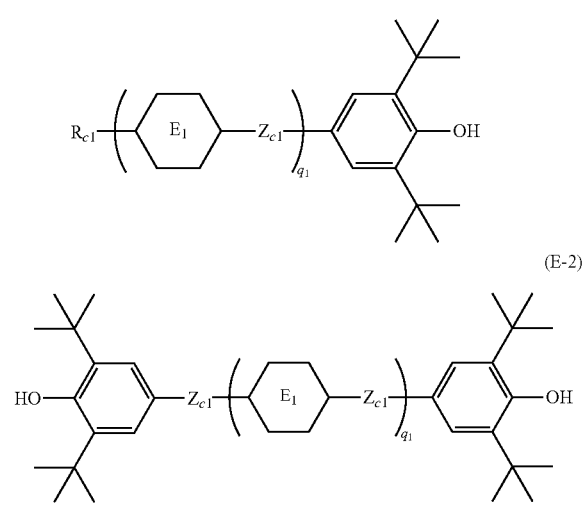

(where in the formulae, $R_{e1}$ is an alkyl group having 1 to 15 carbon atoms, one or two or more —$CH_2$— groups in the alkyl group may each be replaced with —O—, —CH=CH—, —CO—, —OCO—, —COO—, —C≡C—, —$CF_2$O—, or —$OCF_2$— in such a manner that oxygen atoms are not directly adjacent to each other, one or two or more hydrogen atoms in the alkyl group may each be replaced with halogen atom, $Z_{e1}$ and $Z_{e2}$ are each independently a single bond, —CH=CH—, —C≡C—, —$CH_2CH_2$—, —$(CH_2)_4$—, —COO—, —OCO—, —$OCH_2$—, —$CH_2O$—, —$OCF_2$—, or —$CF_2O$—, $E_1$ is a cyclohexane ring or a benzene ring, one or two or more —$CH_2$— groups in the cyclohexane ring may each be replaced with —O— in such a manner that oxygen atoms are not directly adjacent to each other, one or two or more —$CH_2CH_2$— groups in the ring may each be replaced with —CH=CH—, —$CF_2O$—, or —$OCF_2$—, one or two or more —CH= groups in the benzene ring may each be replaced with —N= in such a manner that nitrogen atoms are not directly adjacent to each other, one or more hydrogen atoms in the ring may each be replaced with F, Cl, or $CH_3$, and $q_1$ is 0, 1, 2, or 3).

The liquid crystal composition of the present invention can be used for liquid crystal display devices, in particular, active-matrix liquid crystal display devices such as TN, OCB, ECB, IPS (including FFS electrodes), and VA-IPS (including FFS electrodes)-mode liquid crystal display devices. The VA-IPS mode is a method in which a liquid crystal material having positive dielectric anisotropy (Δε>0) is aligned perpendicular to a substrate surface in a no-voltage-applied state and their liquid crystal molecules are driven by pixel electrodes and a common electrode disposed on the same substrate surface. In this mode, the liquid crystal molecules are aligned along a curved electric field generated by the pixel electrodes and the common electrode. This mode, thus, facilitates pixel division and the formation of multiple domains and provides the advantage of quick response. This mode is known under various names, such as EOC and VA-IPS, as disclosed in the following non-patent literature: Proc. 13th IDW, 97(1997), Proc. 13th IDW, 175(1997), SID Sym. Digest, 319(1998), SID Sym. Digest, 838(1998), SID Sym. Digest, 1085(1998), SID Sym. Digest, 334(2000), and Eurodisplay Proc., 142(2009). In the present invention, this mode is hereinafter referred to as "VA-IPS".

In general, the threshold voltage (Vc) of the Freedericksz transition in the TN- and ECB-modes is given by expression (I):

[Math. 1]

$$Vc = \frac{\pi d_{cell}}{d_{cell} + \langle r1 \rangle} \sqrt{\frac{K11}{\Delta \varepsilon}} \quad (I)$$

The threshold voltage (Vc) of the Freedericksz transition in the STN mode is given by expression (II):

[Math. 2]

$$Vc = \frac{\pi d_{gap}}{d_{cell} + \langle r2 \rangle} \sqrt{\frac{K22}{\Delta \varepsilon}} \quad (II)$$

The threshold voltage (Vc) of the Freedericksz transition in the VA mode is given by expression (III):

[Math. 3]

$$V_C = \frac{\pi d_{cell}}{d_{cell} - \langle r3 \rangle} \sqrt{\frac{K33}{|\Delta\varepsilon|}} \quad (III)$$

(where in the expressions, Vc is the Freedericksz transition (V), Π is the circular constant, $d_{cell}$ is the distance (μm) between a first substrate and a second substrate, $d_{gap}$ is the distance (μm) between pixel electrodes and a common electrode, $d_{ITO}$ is the width (μm) of the pixel electrodes and/or the common electrode, <r1>, <r2>, and <r3> are extrapolation lengths (μm), K11 is the splay elastic constant (N), K22 is the twist elastic constant (N), K33 is the bend elastic constant (N), and Δε is the dielectric anisotropy).

The inventors have found that expression (IV) applies to the VA-IPS mode.

[Math. 4]

$$V_C \propto \frac{d_{gap} - \langle r \rangle}{d_{ITO} + \langle r \rangle} \frac{\pi d_{cell}}{d_{cell} - \langle r3 \rangle} \sqrt{\frac{K33}{|\Delta\varepsilon|}} \quad (IV)$$

(where in the expression, Vc is the Freedericksz transition (V), Π is the circular constant, $d_{cell}$ is the distance (μm) between a first substrate and a second substrate, $d_{gap}$ is the distance (μm) between pixel electrodes and a common electrode, $d_{ITO}$ is the width (μm) of the pixel electrodes and/or the common electrode, <r>, <r'>, and <r3> are extrapolation lengths (μm), K33 is the bend elastic constant (N), and Δε is the dielectric anisotropy). Expression (IV) demonstrates that the use of a cell configuration having a smaller $d_{gap}$ and a larger $d_{ITO}$ results in a lower driving voltage and that the use of a liquid crystal composition having a larger absolute value of Δε and low K33 results in a lower driving voltage.

The liquid crystal composition of the present invention can be adjusted so as to have preferable Δε, K11, and K33.

The product (Δn·d) of the refractive-index anisotropy (Δn) of a liquid crystal composition and the distance (d) between a first substrate and a second substrate of a display device is closely related to viewing angle characteristics and response speed. Thus, the distance (d) tends to be small, i.e., 3 to 4 μm. The product (Δn·d) is preferably 0.31 to 0.33 for TN, ECB, and IPS modes. For the VA-IPS mode, when liquid crystal molecules are aligned perpendicular to both substrates, The product (Δn·d) is preferably 0.20 to 0.59, particularly preferably 0.30 to 0.40. In the cases of TN and ECB modes, in which liquid crystal molecules need to be aligned substantially parallel to a substrate surface in the no-voltage-applied state, the tilt angle is preferably 0.5° to 7°. In the case of the VA-IPS mode, in which liquid crystal molecules need to be aligned substantially perpendicular to the substrate surface in the no-voltage-applied state, the tilt angle is preferably 85° to 90°. To align the liquid crystal composition in this manner, an alignment film composed of, for example, polyimide (PI), polyamide, chalcone, cinnamate, or cinnamoyl may be provided. As the alignment film, an alignment film formed by photo-alignment technology is preferably used.

A liquid crystal composition of the present invention containing a polymerizable compound represented by general formula (PC) can be used to provide a polymer-stabilized TN-, OCB-, ECB-, IPS-, or VA-IPS-mode liquid crystal display device formed by polymerizing the polymerizable compound present in the liquid crystal composition with a voltage applied or with no voltage applied.

EXAMPLES

Although the present invention is described in further detail by the following examples, the present invention is not limited to these examples. Regarding compositions of the examples and comparative examples, "%" refers to "% by mass".

Measurement properties of exemplary compositions of examples are described below.

$T_{ni}$: Nematic phase-isotropic liquid phase transition temperature (° C.)

Δn: Refractive-index anisotropy at 25° C. (also referred to as birefringence)

Δε: Dielectric anisotropy at 25° C.

η: Viscosity at 20° C. (mPa·s)

$\gamma_1$: Rotational viscosity at 25° C. (mPa·s)

VHR: A voltage holding ratio (%) at a frequency of 60 Hz, an applied voltage of 5 V, and a temperature of 333 K VHR against light: A liquid crystal composition is irradiated with ultraviolet radiation using a super-high pressure mercury lamp at 1 kJ/m² through a glass having a thickness of 0.5 mm. The voltage holding ratio of the liquid crystal after the ultraviolet irradiation is measured in the same way as in the foregoing VHR measurement. The irradiation intensity was 1 W/m² at 366 nm.

Compounds are denoted by symbols described below.

TABLE 1

| Symbol | Structure | Symbol | Structure |
|---|---|---|---|
| n | $C_nH_{2n+1}$— | —OCFF— | —OCF$_2$— |
| m | —$C_mH_{2m+1}$ | —V— | —CO— |
| nO | $C_nH_{2n+1}$O— | —VO— | —COO— |
| Om | —O$C_mH_{2m+1}$ | —OV— | —OCO— |
| ndm- | $C_nH_{2n+1}$—CH=CH—(CH$_2$)$_{m-1}$— | —F | —F |
| -ndm | —(CH$_2$)$_{n-1}$—CH=CH—$C_mH_{2m+1}$ | —Cl | —Cl |
| ndmO— | $C_nH_{2n+1}$—CH=CH—(CH$_2$)$_{m-1}$O— | —CN | —C≡N |
| —Ondm | —O—(CH$_2$)$_{n-1}$—CH=CH—$C_mH_{2m+1}$ | —CFFF | —CF$_3$ |
| -2- | —CH$_2$CH$_2$— | —CFF | —CHF$_2$ |
| -d- | —CH=CH— | —OCFFF | —OCF$_3$ |
| -T- | —C≡C— | —OCFF | —OCHF$_2$ |
| -1O— | —CH$_2$O— | —CFFCFFF | —CF$_2$CF$_3$ |
| —O1- | —OCH$_2$— | —OCF=CFF | —OCF=CF$_2$ |
| —CFFO— | —CF$_2$O— | —OCH=CFF | —OCH=CF$_2$ |

[Chem. 45]

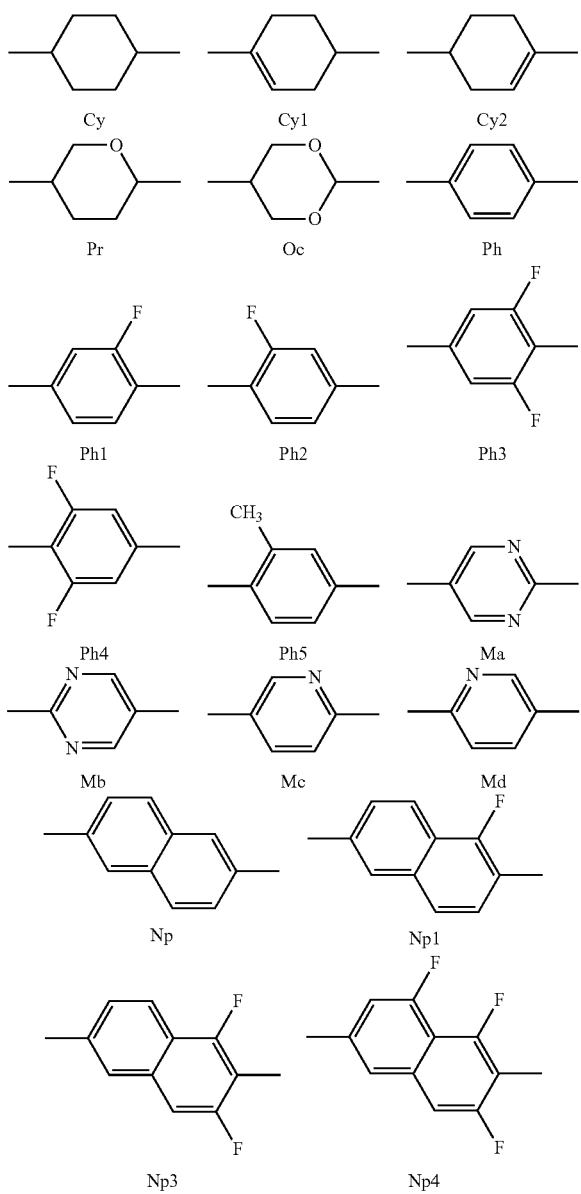

Evaluations performed in examples are described below.

Image-Sticking

Evaluation of image-sticking in a liquid crystal display device was performed as follows: After a predetermined fixed pattern was displayed in a display area for a freely-selected test time (Ht), a uniform image was displayed on the entire display screen. The test time (Ht) that elapsed before the afterimage of the fixed pattern reached an unacceptable afterimage level was measured.

1) The term "test time (Ht)" used here refers to the time required to display the fixed pattern. A longer test time indicates that the occurrence of the afterimage is further inhibited, which indicates higher performance.

2) The term "unacceptable afterimage level" refers to a level at which an afterimage rated as fail in a pass-fail test was observed.

Drop Marks

A liquid crystal display panel was produced and held for 1 hour at room temperature. When an intermediate grayscale was displayed on the entire display area of the panel, drop marks that appeared white were visually observed and were rated on a five-point scale described below.

5: No drop marks were observed (excellent)
4: Very faint drop marks were observed and were at an acceptable level (good)
3: Faint drop marks were observed and were at the borderline level of a pass-fail judgment (pass with conditions)
2: Drop marks were observed and were at an unacceptable level (fail)
1: Extensive drop marks were observed (poor)

Process Suitability

In an ODF process during the production of a 45-inch LCD panel, an appropriate amount of a liquid crystal material was dropped onto the entire front plane with a constant-volume metering pump by 100 µL at a time. The front plane was bonded to a back plane with a sealing agent to produce the LCD panel. After the resulting LCD panel was held in a high-temperature oven with a temperature of 420 K for 30 minutes, an IC was mounted thereon to produce an LCD panel for evaluation. The luminance was measured when an intermediate grayscale was displayed on the entire display area of the LCD panel. The occurrence level of luminance unevenness was rated on a scale of 1 to 5. A larger numeral indicates lower luminance unevenness due to the ODF process and better process suitability.

5: No luminance unevenness was observed (excellent)
4: Very faint luminance unevenness was observed and was at an acceptable level (good)
3: Faint luminance unevenness was observed and was at the borderline level of a pass-fail judgment (pass with conditions)
2: Luminance unevenness was observed and was at unacceptable level (fail)
1: Significant luminance unevenness was observed (poor)

Low-Temperature Solubility

The low-temperature solubility was evaluated as follows: After the preparation of a liquid crystal composition, 1 g of the liquid crystal composition was weighed and placed in a 2 mL sample bottle. The liquid crystal composition was continuously exposed to temperature change cycles in a temperature controlled test chamber, each cycle including the following operation conditions: "−20° C. (held for 1 hour)→a temperature rise (0.1° C./min)→0° C. (held for 1 hour)→a temperature rise (0.1° C./min)→20° C. (held for 1 hour)→a temperature drop (−0.1° C./min)→0° C. (held for 1 hour)→a temperature drop (−0.1° C./min)→−20° C.". The formation of precipitates from the liquid crystal composition was visually observed to measure the test time (the number of hours) that elapsed before the formation of the precipitates were observed.

A longer test time indicates that a liquid crystal phase is stably maintained over prolonged periods of time and has good low-temperature solubility.

Production Apparatus Contamination Characteristics

The volatility of a liquid crystal material was evaluated by visually checking the liquid crystal material for foaming while monitoring the operation state of a vacuum mixing and degassing mixer with a stroboscope. Specifically, 0.8 kg of a liquid crystal composition was placed in a 2.0 L special container of the vacuum mixing and degassing mixer. The vacuum mixing and degassing mixer was operated at a revolution speed 15 S$^{-1}$ and a rotation speed of 7.5 S$^{-1}$ under a reduced pressure of 4 kPa. Observation was made with the stroboscope set so as to emit light in synchronization with the revolution speed. The time that elapsed before the start of foaming was measured (the number of seconds: seconds).

A longer time that elapses before the start of foaming indicates that the liquid crystal material is less volatile, is less likely to cause contamination of the production apparatus, and has higher performance.

Examples 1 to 19 and Comparative Examples 1 to 6

Liquid crystal compositions LC1 to LC9 described below were prepared, and values of their physical properties were measured. Tables 2 to 4 present the structures of the liquid crystal compositions and the measured values of the physical properties.

TABLE 2

|  | LC1 |
| --- | --- |
| 3-Cy-Cy-1d0 | 40 |
| 3-Cy-Cy-1d1 | 12 |
| 0d1-Cy-Cy-Ph-1 | 6 |
| 3-Cy-Cy-Ph-1 | 3 |
| 1-Ph—Ph1—Ph-3d0 | 4 |
| 2-Ph—Ph1—Ph-3d0 | 6 |
| 5-Cy-Ph—Ph1—Ph-3 | 4 |
| 3-Ph—Ph3—CFFO—Ph3—F | 20 |
| 3-Ph—Ph1—Ph3—CFFO—Ph3—F | 5 |
| TNI (° C.) | 71.4 |
| Δn | 0.108 |
| Δε | 5.3 |
| γ1/mPa · s | 47 |
| η/mPa · s | 10.1 |
|  | LC2 |
| 3-Cy-Cy-1d0 | 50 |
| 3-Cy-Cy-1d1 | 4 |
| 3-Cy-Cy-Ph-1 | 6 |
| 1-Ph—Ph1—Ph-3d0 | 4 |
| 2-Ph—Ph1—Ph-3d0 | 6 |
| 3-Ph—Ph1—Ph-3d0 | 8 |
| 3-Ph—Ph3—CFFO—Ph3—F | 10 |
| 3-Ph—Ph1—Ph3—CFFO—Ph3—F | 6 |
| 3-Pr—Ph—Ph3—CFFO—Ph3—F | 6 |
| TNI (° C.) | 73.9 |
| Δn | 0.112 |
| Δε | 4.8 |
| γ1/mPa · s | 45 |
| η/mPa · s | 9.5 |
|  | LC3 |
| 3-Cy-Cy-1d0 | 55 |
| 3-Cy-Cy-1d1 | 11 |
| 1-Ph—Ph1—Ph-3d0 | 5 |
| 2-Ph—Ph1—Ph-3d0 | 6 |
| 5-Cy-Ph—Ph1—Ph-2 | 4 |
| 5-Cy-Ph—Ph1—Ph-3 | 4 |
| 3-Ph—Ph3—CFFO—Ph3—F | 10 |
| 3-Pr—Ph—Ph3—CFFO—Ph3—F | 5 |
| TNI (° C.) | 74.5 |
| Δn | 0.110 |
| Δε | 3.0 |
| γ1/mPa · s | 42 |
| η/mPa · s | 8.0 |

TABLE 3

|  | LC4 |
| --- | --- |
| 3-Cy-Cy-1d0 | 35 |
| 3-Cy-Cy-1d1 | 7 |
| 0d1-Cy-Cy-Ph-1 | 4 |
| 0d3-Cy-Cy-Ph-1 | 4 |
| 2-Ph—Ph1—Ph-3d0 | 3 |
| 3-Cy-Cy-Ph1—F | 10 |
| 3-Ph—Ph3—CFFO—Ph3—F | 15 |
| 3-Ph—Ph1—Ph3—CFFO—Ph3—F | 3 |

TABLE 3-continued

| 4-Ph—Ph1—Ph3—CFFO—Ph3—F | 6 |
| --- | --- |
| 5-Ph—Ph1—Ph3—CFFO—Ph3—F | 3 |
| 2-Pr—Ph—Ph3—CFFO—Ph3—F | 4 |
| 3-Pr—Ph—Ph3—CFFO—Ph3—F | 6 |
| TNI (° C.) | 82.9 |
| Δn | 0.094 |
| Δε | 9.6 |
| γ1/mPa · s | 57 |
| η/mPa · s | 9.7 |
|  | LC5 |
| 3-Cy-Cy-1d0 | 34 |
| 3-Cy-Cy-1d1 | 5 |
| 0d1-Cy-Cy-Ph-1 | 9.5 |
| 2-Ph—Ph1—Ph-3d0 | 3 |
| 3-Ph—Ph3—CFFO—Ph3—F | 18.5 |
| 3-Ph—Ph1—Ph3—CFFO—Ph3—F | 4 |
| 4-Ph—Ph1—Ph3—CFFO—Ph3—F | 8 |
| 5-Ph—Ph1—Ph3—CFFO—Ph3—F | 5 |
| 2-Pr—Ph—Ph3—CFFO—Ph3—F | 5 |
| 3-Pr—Ph—Ph3—CFFO—Ph3—F | 8 |
| TNI (° C.) | 78.4 |
| Δn | 0.108 |
| Δε | 11.5 |
| γ1/mPa · s | 65 |
| η/mPa · s | 10.3 |

TABLE 4

|  | LC6 |
| --- | --- |
| 3-Cy-Cy-1d0 | 34 |
| 5-Cy-Cy-1d0 | 5 |
| 0d3-Cy-Cy-Ph-1 | 9.5 |
| 2-Ph—Ph1—Ph-3d0 | 4 |
| 3-Ph—Ph3—CFFO—Ph3—F | 18.5 |
| 3-Ph—Ph1—Ph3—CFFO—Ph3—F | 4 |
| 4-Ph—Ph1—Ph3—CFFO—Ph3—F | 7 |
| 5-Ph—Ph1—Ph3—CFFO—Ph3—F | 5 |
| 2-Pr—Ph—Ph3—CFFO—Ph3—F | 5 |
| 3-Pr—Ph—Ph3—CFFO—Ph3—F | 8 |
| TNI (° C.) | 79.2 |
| Δn | 0.107 |
| Δε | 11.1 |
| γ1/mPa · s | 66 |
| η/mPa · s | 11.7 |
|  | LC7 |
| 3-Cy-Cy-1d0 | 40 |
| 0d1-Cy-Cy-Ph-1 | 9 |
| 2-Ph—Ph1—Ph-3d0 | 3 |
| 3-Ph—Ph3—CFFO—Ph3—F | 18 |
| 3-Ph—Ph1—Ph3—CFFO—Ph3—F | 4 |
| 4-Ph—Ph1—Ph3—CFFO—Ph3—F | 8 |
| 5-Ph—Ph1—Ph3—CFFO—Ph3—F | 5 |
| 2-Pr—Ph—Ph3—CFFO—Ph3—F | 5 |
| 3-Pr—Ph—Ph3—CFFO—Ph3—F | 8 |
| TNI (° C.) | 76.0 |
| Δn | 0.105 |
| Δε | 11.4 |
| γ1/mPa · s | 62 |
| η/mPa · s | 10.8 |
|  | LC8 |
| 3-Cy-Cy-1d0 | 22 |
| 3-Cy-Cy-1d1 | 8 |
| 5-Cy-Cy-1d0 | 8 |
| 0d1-Cy-Cy-Ph-1 | 10 |
| 1-Ph—Ph1—Ph-3d0 | 4 |
| 3-Ph—Ph3—CFFO—Ph3—F | 18 |
| 3-Ph—Ph1—Ph3—CFFO—Ph3—F | 4 |

TABLE 4-continued

| | |
|---|---|
| 4-Ph—Ph1—Ph3—CFFO—Ph3—F | 8 |
| 5-Ph—Ph1—Ph3—CFFO—Ph3—F | 5 |
| 2-Pr—Ph—Ph3—CFFO—Ph3—F | 5 |
| 3-Pr—Ph—Ph3—CFFO—Ph3—F | 8 |
| TNI (° C.) | 82.0 |
| Δn | 0.111 |
| Δε | 11.4 |
| γ1/mPa · s | 70 |
| η/mPa · s | 12.3 |

Compounds of formulae (I-1a), (I-2a), and (I-3a) were added alone or in combination of two or more thereof to liquid crystal compositions LC1 to LC8 to prepare liquid crystal compositions. As comparative examples, liquid crystal compositions containing a compound represented by formula (W) were prepared. Tables 5 to 7 present the VHR against light, the process suitability, and so forth. In the tables, the low-temperature solubility (H) indicates the test time (the number of hours) that elapsed before the formation of the precipitates were observed, and the Production apparatus contamination characteristics (s) indicates the time (the number of seconds) that elapsed before the start of foaming.

[Chem. 46]

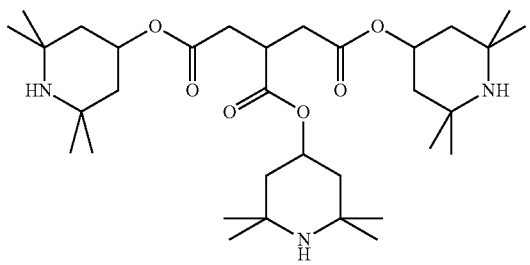
(I-1a)

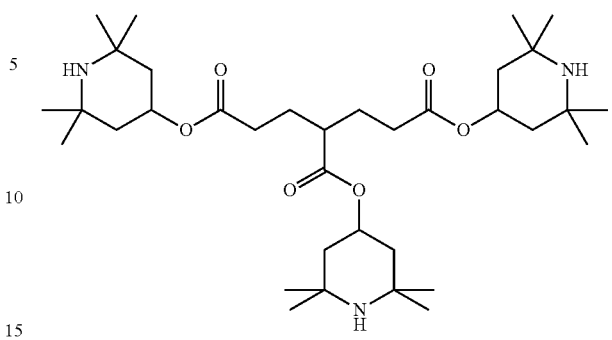
(I-2a)

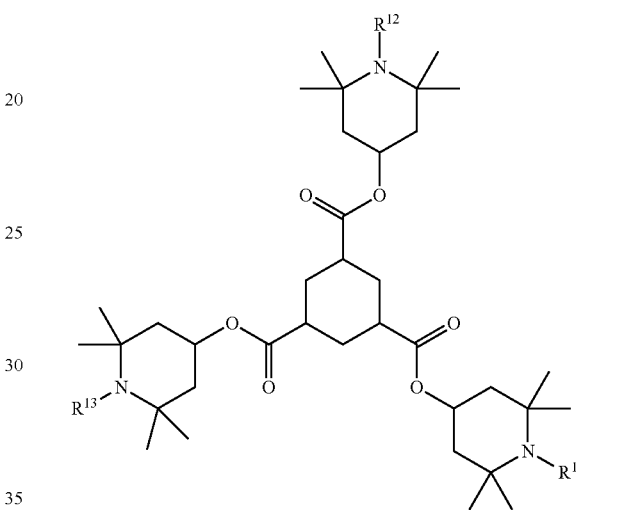
(I-3a)

[Chem. 47]

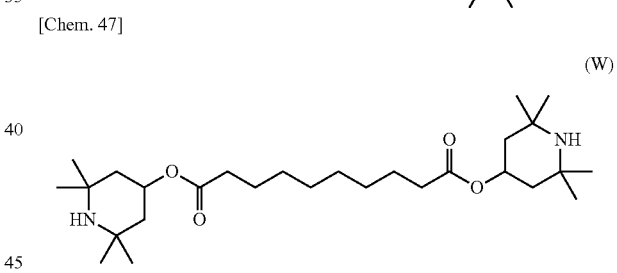
(W)

TABLE 5

| | Example 1 | Example 2 | Example 3 | Example 4 | Example 5 | Example 6 | Example 7 |
|---|---|---|---|---|---|---|---|
| Liquid crystal composition | LC1 | LC1 | LC1 | LC2 | LC2 | LC3 | LC3 |
| Liquid crystal composition (parts by mass) | 100 | 100 | 100 | 100 | 100 | 100 | 100 |
| I-1a (parts by mass) | 0.10 | | | 0.05 | | 0.02 | |
| I-2a (parts by mass) | | 0.10 | | 0.05 | | | 0.02 |
| I-3a (parts by mass) | | | 0.10 | | | | |
| VHR (%) | 99.5 | 99.3 | 99.3 | 99.4 | 99.6 | 99.5 | 99.6 |
| VHR against light (%) | 94.9 | 95.0 | 94.0 | 93.3 | 93.0 | 93.2 | 93.2 |
| Image-sticking (H) | 1152 | 1200 | 1008 | 1200 | 1176 | 1080 | 1128 |
| Drop marks | 4 | 4 | 5 | 5 | 4 | 5 | 5 |
| Process suitability | 5 | 5 | 4 | 5 | 5 | 5 | 5 |
| Low-temperature solubility (H) | 480 | 576 | 552 | 504 | 696 | 744 | 840 |

TABLE 5-continued

|  | Example 1 | Example 2 | Example 3 | Example 4 | Example 5 | Example 6 | Example 7 |
|---|---|---|---|---|---|---|---|
| Production apparatus contamination characteristics (S) | 185 | 180 | 185 | 170 | 175 | 175 | 170 |

TABLE 6

|  | Comparative example 1 | Comparative example 2 |
|---|---|---|
| Liquid crystal composition | LC1 | LC1 |
| Liquid crystal composition (parts by mass) | 100 | 100 |
| W (parts by mass) |  | 0.10 |
| VHR (%) | 99.4 | 99.2 |
| VHR against light (%) | 75.5 | 88.7 |
| Image-sticking (H) | 480 | 864 |
| Drop marks | 3 | 4 |
| Process suitability | 3 | 4 |
| Low-temperature solubility (H) | 576 | 480 |
| Production apparatus contamination characteristics (S) | 180 | 185 |

TABLE 9

|  | Comparative example 5 | Comparative example 6 |
|---|---|---|
| Liquid crystal composition | LC6 | LC6 |
| Liquid crystal composition (parts by mass) | 100 | 100 |
| W (parts by mass) |  | 0.10 |
| VHR (%) | 98.8 | 98.7 |
| VHR against light (%) | 65.3 | 81.9 |
| Image-sticking (H) | 408 | 624 |
| Drop marks | 3 | 4 |
| Process suitability | 3 | 4 |
| Low-temperature solubility (H) | 672 | 552 |
| Production apparatus contamination characteristics (S) | 200 | 200 |

TABLE 7

|  | Comparative example 3 | Comparative example 4 | Example 8 | Example 9 | Example 10 | Example 11 | Example 12 |
|---|---|---|---|---|---|---|---|
| Liquid crystal composition | LC4 | LC4 | LC4 | LC4 | LC4 | LC5 | LC5 |
| Liquid crystal composition (parts by mass) | 100 | 100 | 100 | 100 | 100 | 100 | 100 |
| W (parts by mass) |  | 0.10 |  |  |  |  |  |
| I-1a (parts by mass) |  |  |  |  |  | 0.05 |  |
| 1-2a (parts by mass) |  |  | 0.10 | 0.15 |  |  | 0.05 |
| 1-3a (parts by mass) |  |  |  |  | 0.10 |  |  |
| VHR (%) | 99.1 | 99.0 | 98.9 | 98.8 | 98.9 | 99.0 | 98.9 |
| VHR against light (%) | 72.4 | 86.2 | 93.3 | 94.0 | 92.1 | 92.5 | 93.0 |
| Image-sticking (H) | 528 | 720 | 888 | 816 | 816 | 840 | 1104 |
| Drop marks | 3 | 4 | 4 | 5 | 5 | 5 | 4 |
| Process suitability | 3 | 4 | 5 | 5 | 4 | 5 | 5 |
| Low-temperature solubility (H) | 672 | 528 | 624 | 600 | 576 | 576 | 720 |
| Production apparatus contamination characteristics (S) | 200 | 200 | 200 | 200 | 200 | 195 | 200 |

TABLE 8

|  | Example 13 | Example 14 | Example 15 | Example 16 | Example 17 | Example 18 | Example 19 |
|---|---|---|---|---|---|---|---|
| Liquid crystal composition | LC6 | LC6 | LC6 | LC7 | LC7 | LC8 | LC8 |
| Liquid crystal composition (parts by mass) | 100 | 100 | 100 | 100 | 100 | 100 | 100 |
| I-1a (parts by mass) | 0.02 | 0.05 |  | 0.10 | 0.15 |  |  |
| I-2a (parts by mass) | 0.08 | 0.10 |  |  |  | 0.15 | 0.20 |
| I-3a (parts by mass) |  |  | 0.10 |  |  |  |  |
| VHR (%) | 99.2 | 99.0 | 99.2 | 98.9 | 99.2 | 99.0 | 99.3 |
| VHR against light (%) | 93.7 | 95.1 | 91.9 | 93.2 | 94.0 | 90.5 | 89.7 |
| Image-sticking (H) | 792 | 912 | 768 | 1176 | 1224 | 1272 | 1488 |
| Drop marks | 4 | 5 | 5 | 4 | 4 | 5 | 5 |
| Process suitability | 5 | 5 | 5 | 5 | 5 | 5 | 4 |
| Low-temperature solubility (H) | 696 | 720 | 648 | 528 | 408 | 552 | 480 |
| Production apparatus contamination characteristics (S) | 205 | 200 | 205 | 200 | 205 | 195 | 195 |

The results demonstrated that the addition of the compounds represented by formulae (I-1a), (I-2a), and (I-3a) alone or in combination of two or more thereof to LC1 to LC8 improved the VHR against light and the image-sticking without degrading the low-temperature solubility, the process suitability, or the like and results in a high VHR against light and good low-temperature solubility, compared with the case where the compound of formula (W) was added.

Examples 20 to 23 and Comparative Examples 7 to 10

Liquid crystal compositions LC9 to LC13 described below were prepared, and values of their physical properties were measured. Tables 8 and 9 present the structures of the liquid crystal compositions and the measured values of the physical properties.

TABLE 10

|  | LC9 |
| --- | --- |
| 3-Cy-Cy-1d0 | 32 |
| 0d1-Cy-Cy-Ph-1 | 6 |
| 0d3-Cy-Cy-Ph-1 | 4 |
| 5-Ph—Ph-1 | 8 |
| 3-Cy-Ph—Ph-2 | 5 |
| 0d1-Cy-Ph—Ph-3 | 4 |
| 3-Ph—Ph1—Ph3—O2d0 | 16 |
| 2-Ph—Ph1—Np-3 | 4 |
| 4-Ph3—O1-Oc-Ph—Ph3—F | 3 |
| 5-Ph3—O1-Oc-Ph—Ph3—F | 3 |
| 3-Ph3—O1—Ph—Np3—F | 5 |
| 3-Ph3—O1-Oc-Ph1—Ph3—F | 6 |
| 5-Ph3—O1-Oc-Ph1—Ph3—F | 4 |
| Tni(° C.) | 81.2 |
| $\Delta n$ | 0.133 |
| $\Delta \varepsilon$ | 7.2 |
| $\gamma 1/mPa \cdot s$ | 66 |
| $\eta/mPa \cdot s$ | 19.1 |
|  | LC10 |
| 3-Cy-Cy-1d0 | 44 |
| 5-Cy-Cy-1d0 | 4 |
| 0d1-Cy-Cy-Ph-1 | 15 |
| 3-Cy-Cy-Ph-1 | 3 |
| 3-Cy-Cy-VO—Ph-Cy-3 | 3 |
| 3-Ph—Ph1—Ph3—O2d0 | 6 |
| 2-Cy-Ph—Ph3—O1—Ph3—F | 3 |
| 3-Cy-Ph—Ph3—O1—Ph3—F | 5 |
| 3-Ph3—O1-Oc-Ph—Ph3—F | 4 |
| 4-Ph3—O1-Oc-Ph—Ph3—F | 4 |
| 3-Ph3—O1-Oc-Ph1—Ph3—F | 5 |
| 5-Ph3—O1-Oc-Ph1—Ph3—F | 4 |
| Tni(° C.) | 92.3 |
| $\Delta n$ | 0.096 |
| $\Delta \varepsilon$ | 6.7 |
| $\gamma 1/mPa \cdot s$ | 61 |
| $\eta/mPa \cdot s$ | 12.8 |
|  | LC11 |
| 3-Cy-Cy-1d0 | 44 |
| 3-Cy-Cy-1d1 | 12 |
| 5-Ph—Ph-1 | 3.5 |
| 3-Cy-Ph—Ph-2 | 5 |
| 0d1-Cy-Ph—Ph-3 | 5.5 |
| 3-Ph—Ph1—Ph3—O2d0 | 20 |
| 2-Ph—Ph1—Np-3 | 3 |
| 3-Cy-Ph—Ph3—O1—Ph3—F | 4 |

TABLE 10-continued

| 3-Ph3—O1-Oc-Ph—Ph3—F | 3 |
| --- | --- |
| Tni(° C.) | 76.1 |
| $\Delta n$ | 0.118 |
| $\Delta \varepsilon$ | 2.2 |
| $\gamma 1/mPa \cdot s$ | 36 |
| $\eta/mPa \cdot s$ | 9.4 |

TABLE 11

|  | LC12 |
| --- | --- |
| 3-Cy-Cy-1d0 | 10 |
| 3-Cy-Cy-1d1 | 5 |
| 0d1-Cy-Cy-Ph-1 | 6 |
| 0d3-Cy-Cy-Ph-1 | 4 |
| 0d1-Cy-Ph—Ph-3 | 4 |
| 2-Ph—Ph1—Ph3—O2d0 | 6 |
| 3-Ph—Ph1—Ph3—O2d0 | 8 |
| 5-Ph—Ph1—Ph3—O2d0 | 6 |
| 3-Ph—Ph3—CFFO—Ph3—F | 15 |
| 3-Cy-Cy-CFFO—Ph3—F | 8 |
| 3-Ph—Ph1—Ph3—CFFO—Np3—F | 4 |
| 4-Ph—Ph1—Ph3—CFFO—Ph3—F | 4 |
| 3-Pr—Ph—Ph3—CFFO—Ph3—F | 6 |
| 3-Cy-Cy-Ph3—F | 6 |
| 3-Cy-Ph—Ph3—F | 8 |
| Tni(° C.) | 86.7 |
| $\Delta n$ | 0.144 |
| $\Delta \varepsilon$ | 11.9 |
| $\gamma 1/mPa \cdot s$ | 114 |
| $\eta/mPa \cdot s$ | 22.4 |
|  | LC13 |
| 3-Cy-Cy-1d0 | 26 |
| 3-Cy-Ph—O1 | 5 |
| 0d1-Cy-Cy-Ph-1 | 15 |
| 0d3-Cy-Cy-Ph-1 | 11 |
| 0d1-Cy-Ph—Ph-3 | 3 |
| 3-Cy-Ph—Ph-2 | 3 |
| 3-Cy-Cy-VO—Ph-Cy-3 | 5 |
| 3-Ph—Ph1—Ph3—O2d0 | 12 |
| 3-Cy-Ph—Ph3—O1—Ph3—F | 5 |
| 3-Ph3—O1-Oc-Ph—Ph3—F | 4 |
| 4-Ph3—O1-Oc-Ph—Ph3—F | 4 |
| 3-Ph3—O1-Oc-Ph1—Ph3—F | 4 |
| 5-Ph3-O1-Oc-Ph1—Ph3—F | 3 |
| Tni(° C.) | 112.7 |
| $\Delta n$ | 0.120 |
| $\Delta \varepsilon$ | 6.0 |
| $\gamma 1/mPa \cdot s$ | 88 |
| $\eta/mPa \cdot s$ | 16.8 |

Compounds of formulae (I-1a), (I-2a), and (I-3a) were added alone or in combination of two or more thereof to liquid crystal compositions LC9 to LC13 to prepare liquid crystal compositions. As comparative examples, liquid crystal compositions containing the compound represented by formula (W) were prepared. Tables 10 and 11 present the VHR against light, the process suitability, and so forth.

TABLE 12

| | Comparative example 7 | Comparative example 8 | Example 20 | Example 21 | Example 22 |
|---|---|---|---|---|---|
| Liquid crystal composition | LC9 | LC9 | LC9 | LC10 | LC11 |
| Liquid crystal composition (parts by mass) | 100 | 100 | 100 | 100 | 100 |
| W (parts by mass) | | 0.10 | | | |
| I-1a (parts by mass) | | | | 0.10 | 0.05 |
| I-2a (parts by mass) | | | 0.10 | | 0.10 |
| VHR (%) | 99.1 | 99.1 | 99.2 | 98.9 | 99.6 |
| VHR against light (%) | 57.0 | 78.5 | 89.5 | 93.5 | 95.8 |
| Image-sticking (H) | 312 | 576 | 984 | 840 | 1080 |
| Drop marks | 3 | 4 | 4 | 4 | 5 |
| Process suitability | 3 | 4 | 5 | 5 | 5 |
| Low-temperature solubility (H) | 576 | 504 | 600 | 528 | 864 |
| Production apparatus contamination characteristics (S) | 195 | 195 | 200 | 195 | 180 |

TABLE 13

| | Comparative example 9 | Comparative example 10 | Example 22 | Example 23 |
|---|---|---|---|---|
| Liquid crystal composition | LC12 | LC12 | LC12 | LC13 |
| Liquid crystal composition (parts by mass) | 100 | 100 | 100 | 100 |
| W (parts by mass) | | 0.10 | | |
| I-1a (parts by mass) | | | | |
| I-2a (parts by mass) | | | 0.15 | 0.15 |
| VHR (%) | 99.6 | 99.6 | 99.3 | 99.6 |
| VHR against light (%) | 53.7 | 77.4 | 94.2 | 93.0 |
| Image-sticking (H) | 648 | 792 | 1032 | 1152 |
| Drop marks | 3 | 4 | 5 | 5 |
| Process suitability | 3 | 4 | 5 | 5 |
| Low-temperature solubility (H) | 600 | 576 | 576 | 576 |
| Production apparatus contamination characteristics (S) | 205 | 200 | 200 | 240 |

The results demonstrated that the addition of an appropriate amount of the compound of formula (I-1a) and/or (I-2a) to LC9 to LC13 improved the VHR against light and the image-sticking without degrading the low-temperature solubility, the process suitability, or the like and results in a high VHR against light and good low-temperature solubility, compared with the case where the compound of formula (W) was added.

Accordingly, the foregoing results demonstrated that the liquid crystal composition of the present invention has a sufficiently low viscosity ($\eta$), a sufficiently low rotational viscosity ($\gamma_1$), good low-temperature solubility, a high VHR against light, good image-sticking characteristics, good drop mark characteristics, and good process suitability without lowering the refractive-index anisotropy ($\Delta n$) or the nematic phase-isotropic liquid phase transition temperature ($T_{ni}$) and thus is practical.

The invention claimed is:

1. A liquid crystal composition comprising:
one or two or more compounds represented by general formula (I):

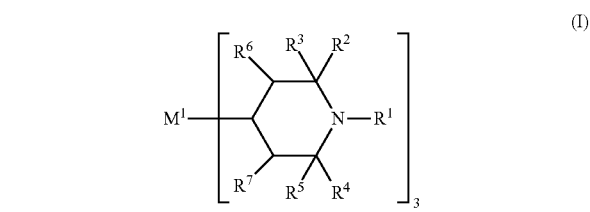

where in the formula, $R^1$ is a hydrogen atom, —O., —OH, or an alkyl group having 1 to 12 carbon atoms, one or two or more —$CH_2$— groups present in the alkyl group are each independently optionally replaced with —O—, —S—, —CH=CH—, —C≡C—, —CO—O—, —O—CO—, —$OCF_2$—, or —$CF_2O$—, $R^2$, $R^3$, $R^4$, and $R^5$ are each independently an alkyl group having 1 to 8 carbon atoms, one or two or more —$CH_2$— groups present in the alkyl group are each independently optionally replaced with —O—, —S—, —CH=CH—, —C≡C—, —CO—O—, —O—CO—, —$OCF_2$—, or —$CF_2O$—, $R^2$ and $R^3$ and/or $R^4$ and $R^5$ are taken together to form a ring, $R^6$ and $R^7$ are each independently a hydrogen atom or an alkyl group having 1 to 6 carbon atoms, one or two or more —$CH_2$— groups present in the alkyl group are each independently optionally replaced with —O—, —S—, —CH=CH—, —C≡C—, —CO—O—, —O—CO—, —$OCF_2$—, or —$CF_2O$—, $M^1$ is a trivalent organic group, and $R^1$'s, $R^2$'s, $R^3$'s, $R^4$'s, $R^5$'s, $R^6$'s, and $R^7$'s present in a plurality are optionally the same or different; and one or two or more compounds represented by general formula (J):

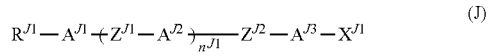
(J)

where in the formula, $R^{J1}$ is an alkyl group having 1 to 10 carbon atoms, one —$CH_2$— group or two or more non-adjacent —$CH_2$— groups in the alkyl group are each independently optionally replaced with —CH=CH—, —C≡C—, —O—, —CO—, —COO—, or —OCO—, $n^{J1}$ is 0, 1, 2, 3, or 4, $A^{J1}$, $A^{J2}$, and $A^{J3}$ are each independently a group selected from the group consisting of:

(a) a 1,4-cyclohexylene group in which one —$CH_2$— group or two or more non-adjacent —$CH_2$— groups present in the group are each optionally replaced with —O—, (b) a 1,4-phenylene group in which one —CH= group or two or more non-adjacent —CH= groups present in the group are each optionally replaced with —N=, and (c) a naphthalene-2,6-diyl group, a 1,2,3,4-tetrahydronaphthalene-2,6-diyl group, or a decahydronaphthalene-2,6-diyl group in which one —CH= group or two or more non-adjacent —CH= groups present in the naphthalene-2,6-diyl group or the 1,2,3,4-tetrahydronaphthalene-2,6-diyl group are each optionally replaced with —N=, the groups (a), (b), and (c) are each independently optionally substituted with a cyano group, a fluorine atom, a chlorine atom, a methyl group, a trifluoromethyl group, or a trifluoromethoxy group, $Z^{J1}$ and $Z^{J2}$ are each independently a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, in the case where $n^{J1}$ is 2, 3, or 4 and where a plurality of $A^{J2}$'s are present, $A^{J2}$'s are optionally the same or different, in the case where $n^{J1}$ is 2, 3, or 4 and where a plurality of $Z^{J1}$'s are present, $Z^{J1}$'s are optionally the same or different, and $X^{J1}$ is a fluorine atom, a chlorine atom, a cyano group, a trifluoromethyl group, a fluoromethoxy group, a difluoromethoxy group, a trifluoromethoxy group, or a 2,2,2-trifluoroethyl group, wherein the liquid crystal composition has positive dielectric anisotropy (Δε) at 25° C.

2. The liquid crystal composition according to claim 1, further comprising:

one or two or more compounds selected from compounds represented by general formula (L):

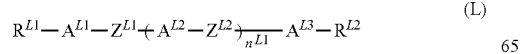
(L)

where in the formula, $R^{L1}$ and $R^{L2}$ are each independently an alkyl group having 1 to 8 carbon atoms, one —$CH_2$— group or two or more non-adjacent —$CH_2$— groups in the alkyl group are each independently optionally replaced with —CH=CH—, —C≡C—, —O—, —CO—, —COO—, or —OCO—, $n^{L1}$ is 0, 1, 2, or 3, $A^{L1}$, $A^{L2}$, and $A^{L3}$ are each independently a group selected from the group consisting of:

(a) a 1,4-cyclohexylene group in which one —$CH_2$— group or two or more non-adjacent —$CH_2$— groups present in the group are each optionally replaced with —O—, (b) a 1,4-phenylene group in which one —CH= group or two or more non-adjacent —CH= groups present in the group are each optionally replaced with —N=, and (c) a naphthalene-2,6-diyl group, a 1,2,3,4-tetrahydronaphthalene-2,6-diyl group, or a decahydronaphthalene-2,6-diyl group in which one —CH= group or two or more non-adjacent —CH= groups present in the naphthalene-2,6-diyl group or the 1,2,3,4-tetrahydronaphthalene-2,6-diyl group are each optionally replaced with —N=, the groups (a), (b), and (c) are each independently optionally substituted with a cyano group, a fluorine atom, or a chlorine atom, $Z^{L1}$ and $Z^{L2}$ are each independently a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, in the case where $n^{L1}$ is 2 or 3 and where a plurality of $A^{L2}$'s are present, $A^{L2}$'s are optionally the same or different, and in the case where $n^{L1}$ is 2 or 3 and a plurality of $Z^{L3}$'s are present, $Z^{L3}$'s are optionally the same or different, provided that the compounds represented by general formulae (J) is excluded.

3. The liquid crystal composition according to claim 1, wherein a total content of general formula (I) in the liquid crystal composition is 0.01% by mass to 5% by mass.

4. The liquid crystal composition according to claim 1, wherein a total content of the compounds represented by general formula (J) in the liquid crystal composition is 10% by mass to 90% by mass.

5. The liquid crystal composition according to claim 2, wherein a total content of the compounds represented by general formula (L) in the liquid crystal composition is 10% by mass to 90% by mass.

6. The liquid crystal composition according to claim 1, further comprising one or two or more polymerizable compounds and/or one or two or more antioxidants.

7. A liquid crystal display device comprising the liquid crystal composition according to claim 1.

8. The liquid crystal composition according to claim 1, wherein said one or two or more compounds represented by general formula (J) comprises one or two or more compounds represented by general formula (M):

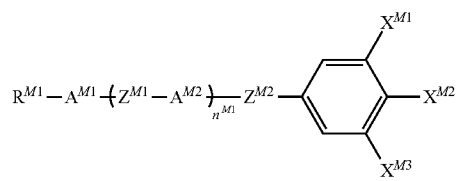
(M)

where in the general formula (M), $R^{M1}$, $A^{M1}$, $A^{M2}$, $Z^{M1}$, $Z^{M2}$, $n^{M1}$, and $X^{M2}$ are the same as $R^{J1}$, $A^{J1}$, $A^{J2}$, $Z^{J1}$, $Z^{J2}$, $n^{J1}$, and $X^{J1}$, respectively, in the general formula (J), and $X^{M1}$ and $X^{M3}$ are each independently a hydrogen atom, a chlorine atom, or a fluorine atom.

* * * * *